US012603019B2

(12) United States Patent
Takatsuka et al.

(10) Patent No.: US 12,603,019 B2
(45) Date of Patent: Apr. 14, 2026

(54) SENSOR DEVICE AND ENCRYPTION METHOD

(71) Applicant: Sony Group Corporation, Tokyo (JP)

(72) Inventors: Susumu Takatsuka, Tokyo (JP); Kenta Kawamoto, Kanagawa (JP); Hiroki Tetsukawa, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 18/526,662

(22) Filed: Dec. 1, 2023

(65) Prior Publication Data

US 2024/0119867 A1 Apr. 11, 2024

Related U.S. Application Data

(63) Continuation of application No. 17/312,242, filed as application No. PCT/JP2020/002121 on Jan. 22, 2020, now Pat. No. 11,955,032.

(30) Foreign Application Priority Data

Jan. 30, 2019 (JP) ................................. 2019-013968

(51) Int. Cl.
*G09C 1/00* (2006.01)
*H04L 9/08* (2006.01)

(52) U.S. Cl.
CPC .............. *G09C 1/00* (2013.01); *H04L 9/0869* (2013.01)

(58) Field of Classification Search
CPC ........... G09C 1/00; G09C 1/06; H04L 9/0869; H04L 9/0825; G06F 21/6209; H04K 1/00
See application file for complete search history.

(56) References Cited

U.S. PATENT DOCUMENTS 5,598,472 A 1/1997 Schuchman et al.
7,240,208 B1 * 7/2007 Oakley ................. H04L 9/0897
380/246
9,830,467 B1 * 11/2017 Harold .................. H04L 9/0656
(Continued)

FOREIGN PATENT DOCUMENTS

CN 101682682 A 3/2010
CN 102063694 A 5/2011
(Continued)

OTHER PUBLICATIONS

Wu, Nan, et al. "A novel quantum random No. generation algorithm used by smartphone camera." Quantum Information and Computation XIII. vol. 9500. SPIE, 2015. (Year: 2015).*
(Continued)

*Primary Examiner* — Sangseok Park
(74) *Attorney, Agent, or Firm* — Michael Best & Friedrich LLP

(57) ABSTRACT

To achieve an improvement in security in encryption of an image signal obtained through imaging by an array sensor. A sensor device includes: an array sensor in which a plurality of pixels including light-receiving elements for visible light or invisible light are arrayed 1-dimensionally or 2-dimensionally; and an encryption unit configured to encrypt a read signal from the pixels of the array sensor. By encrypting a read signal, it is possible to achieve an improvement in security by enabling the image signal not to be stored in plain text in a memory.

20 Claims, 20 Drawing Sheets

(56)  References Cited

U.S. PATENT DOCUMENTS

| | | | |
|---|---|---|---|
| 2007/0016959 A1 | 1/2007 | Ikeda et al. | |
| 2008/0149866 A1 | 6/2008 | Deshazer et al. | |
| 2009/0323950 A1 | 12/2009 | Nakagata | |
| 2010/0074437 A1 | 3/2010 | Inami | |
| 2012/0138774 A1 | 6/2012 | Kelly et al. | |
| 2012/0140089 A1* | 6/2012 | Koh | H04N 25/46 |
| | | | 348/222.1 |
| 2015/0089241 A1 | 3/2015 | Khao | |
| 2015/0106623 A1 | 4/2015 | Holman et al. | |
| 2016/0285626 A1 | 9/2016 | Myers | |
| 2018/0097636 A1 | 4/2018 | Myers | |
| 2020/0026888 A1* | 1/2020 | Mobley | G06F 7/588 |

FOREIGN PATENT DOCUMENTS

| | | |
|---|---|---|
| CN | 102572314 A | 7/2012 |
| CN | 103248854 A | 8/2013 |
| CN | 103458316 A | 12/2013 |
| CN | 106156654 A | 11/2016 |
| CN | 106972934 A | 7/2017 |
| CN | 107852471 A | 3/2018 |
| JP | 09-093560 A | 4/1997 |
| JP | H11-8842 A | 1/1999 |
| JP | 2004200762 A | 7/2004 |
| JP | 2008537622 A | 9/2008 |
| JP | 2009027333 A | 2/2009 |
| JP | 2010226506 | 10/2010 |
| KR | 20070018360 A | 2/2007 |
| WO | 2016/167076 A1 | 10/2016 |

OTHER PUBLICATIONS

Peng Zhang et al. : "Privacy enabled video surveillance using a two state Markov tracking algorithm", Multimedia Systems, Springer, Berlin, DE, vol. 18, No. 2, Aug. 20, 2011 (Aug. 20, 2011), pp. 175-199, XP035018859, ISSN: 1432-1882, DOI:10.1007/S00530-011-0247-8 * sections 2 to 4*.

* cited by examiner

| V1 | V2 | V3 | V4 | V5 | V6 |
|----|----|----|----|----|----|
| V7 | V8 | V9 | V10 | V11 | V12 |
| V13 | V14 | V15 | V16 | V17 | V18 |
| V19 | V20 | V21 | V22 | V23 | V24 |
| V25 | V26 | V27 | V28 | V29 | V30 |
| V31 | V32 | V33 | V34 | V35 | V36 |

STILL IMAGE
(SEED FRAME)

| V26 | V30 | V29 | V27 | V25 | V28 |
|----|----|----|----|----|----|
| V20 | V24 | V23 | V21 | V19 | V22 |
| V2 | V6 | V5 | V3 | V1 | V4 |
| V14 | V18 | V17 | V15 | V13 | V16 |
| V32 | V36 | V35 | V33 | V31 | V34 |
| V8 | V12 | V11 | V9 | V7 | V10 |

ENCRYPTION FILTER
(ENCRYPTION KEY)

21

SENSOR DEVICE AND ENCRYPTION METHOD

CROSS REFERENCE TO RELATED APPLICATIONS

This application is a Continuation Application of U.S. patent application Ser. No. 17/312,242, filed Jun. 9, 2021. which is a 371 Nationalization of PCT/JP2020/002121, filed Jan. 22, 2020, and claims the benefit of Japanese Priority Patent Application JP 2019-013968 filed on Jan. 30, 2019, the entire contents of which are incorporated herein by reference.

TECHNICAL FIELD

The present invention relates to a sensor device and an encryption method and, in particular, to the technical field related to encryption of an image signal obtained from an array sensor.

BACKGROUND ART

Image signals obtained through imaging by array sensors (image sensors) in which a plurality of light-receiving elements are arrayed are encrypted in some cases. For example, for image signals obtained through imaging by monitoring cameras, encrypting the image signals so that individual people are not specified as subjects is considered.

As a technology of the related art, PTL 1 discloses that captured images can be encrypted.

CITATION LIST

Patent Literature

PTL 1
Japanese Patent Application Laid-open No. 2009-027333

SUMMARY

Technical Problem

In the related art, such a type of encryption is performed on an image signal read from an array sensor and temporarily stored with plan text in an external memory. Therefore, there is a risk of hacking by causing an error to arise intentionally at a timing of encryption using malware or the like, outputting memory content as a dump file, and copying plain text put on a memory.

The present technology has been devised in view of such circumstances and an objective of the present technology is to achieve an improvement in security in encryption of an image signal obtained through imaging by an array sensor.

Solution to Problem

According to an aspect of the present invention, a sensor device includes: an array sensor in which a plurality of pixels including light-receiving elements for visible light or invisible light are arrayed 1-dimensionally or 2-dimensionally; and an encryption unit configured to encrypt a read signal from the pixels of the array sensor.

By encrypting the read signal in this way, it is possible to cause an image signal not to be stored in plain text in a memory.

In the sensor device according to the aspect of the present technology, it is considered that the encryption unit includes a first amplitude control unit that performs amplitude control of the read signal using an analog signal and the first amplitude control unit performs the amplitude control in accordance with an encryption key to encrypt the read signal.

It is very difficult to acquire the read signal with an analog signal from the outside of the sensor device.

In the sensor device according to the aspect of the present technology, it is considered that the encryption unit includes a second amplitude control unit that performs amplitude control of the read signal converted into a digital signal by an A/D converter and the second amplitude control unit performs the amplitude control in accordance with an encryption key to encrypt the read signal.

Thus, the encryption is performed through amplitude control on the digital signal, and it is possible to achieve a further improvement in accuracy of the encryption process than in a case where the amplitude control is performed on an analog signal.

In the sensor device according to the aspect of the present technology, it is considered that the array sensor and the encryption unit are configured in one package.

Thus, it is possible to achieve tamper resistance in terms of hardware.

In the sensor device according to the aspect of the present technology, it is considered that the encryption unit generates an encryption key based on a photoelectric random number which is a random number obtained based on photoelectric conversion by the array sensor and encrypts the read signal based on the generated encryption key.

Thus, it is possible to realize encryption in which it is more difficult to decipher the encryption key than in a case where a pseudorandom number is used.

In the sensor device according to the aspect of the present technology, it is considered that the encryption unit generates the encryption key based on the photoelectric random number obtained during a frame period different from a frame period of the read signal which is an encryption target.

Thus, it is possible to increase difficulty in estimating the encryption key from the encrypted image.

In the sensor device according to the aspect of the present technology, it is considered that the encryption unit re-acquires the photoelectric random number in response to detection of unauthorized access from outside of the sensor device.

Thus, after unauthorized access from the outside is detected, the encryption based on the re-acquired photoelectric random number can be performed.

In the sensor device according to the aspect of the present technology, it is considered that the encryption unit erases the previous generated encryption key from a memory in response to the re-acquisition of the photoelectric random number.

Thus, it is possible to prevent leaking of the photoelectric random number using the past encryption.

In the sensor device according to the aspect of the present technology, it is considered that the encryption unit erases an image signal which is an origin of the photoelectric random number from a memory in response to generation of the encryption key.

Thus, it is possible to prevent the photelectric random number from being estimated due to leaking of the image which is an origin of the photoelectric random number.

According to another aspect of the present invention, an encryption method includes: encrypting a read signal from pixels of an array sensor, the plurality of pixels including light-receiving elements for visible light or invisible light and being arrayed 1-dimensionally or 2-dimensionally.

According to the encryption method, it is possible to obtain similar operational effects to those of the sensor device according to the foregoing present technology.

BRIEF DESCRIPTION OF DRAWINGS

FIG. 15 is a diagram illustrating an example of a specific scheme for encryption according to a second embodiment.

DESCRIPTION OF EMBODIMENTS

Hereinafter, an embodiment will be described in the following order.

1. First Embodiment
[1-1. Configuration of sensor device]
[1-2. Random number used for encryption]

[1-3. Processing target signal]
[1-4. Tamper resistance]
[1-5. Processing procedure]
[1-6. Output example of analysis information]
[1-7. Delivery of key]
2. Second Embodiment
[2-1. Encryption scheme of second embodiment]
[2-2. Processing procedure]
[2-3. Output example of analysis information]
<3. Modification examples>
<4. Conclusion of embodiments>
<5. Present technology>

In embodiments to be described below, a sensor device 1 is exemplified as an image sensor that includes a light-receiving element array and outputs an image signal as a detection signal. In particular, the sensor device 1 according to the embodiments is a device that has a function of detecting an object through image analysis and can be called an intelligent array sensor.

1. First Embodiment

1-1. Configuration of Sensor Device

Figure 1:
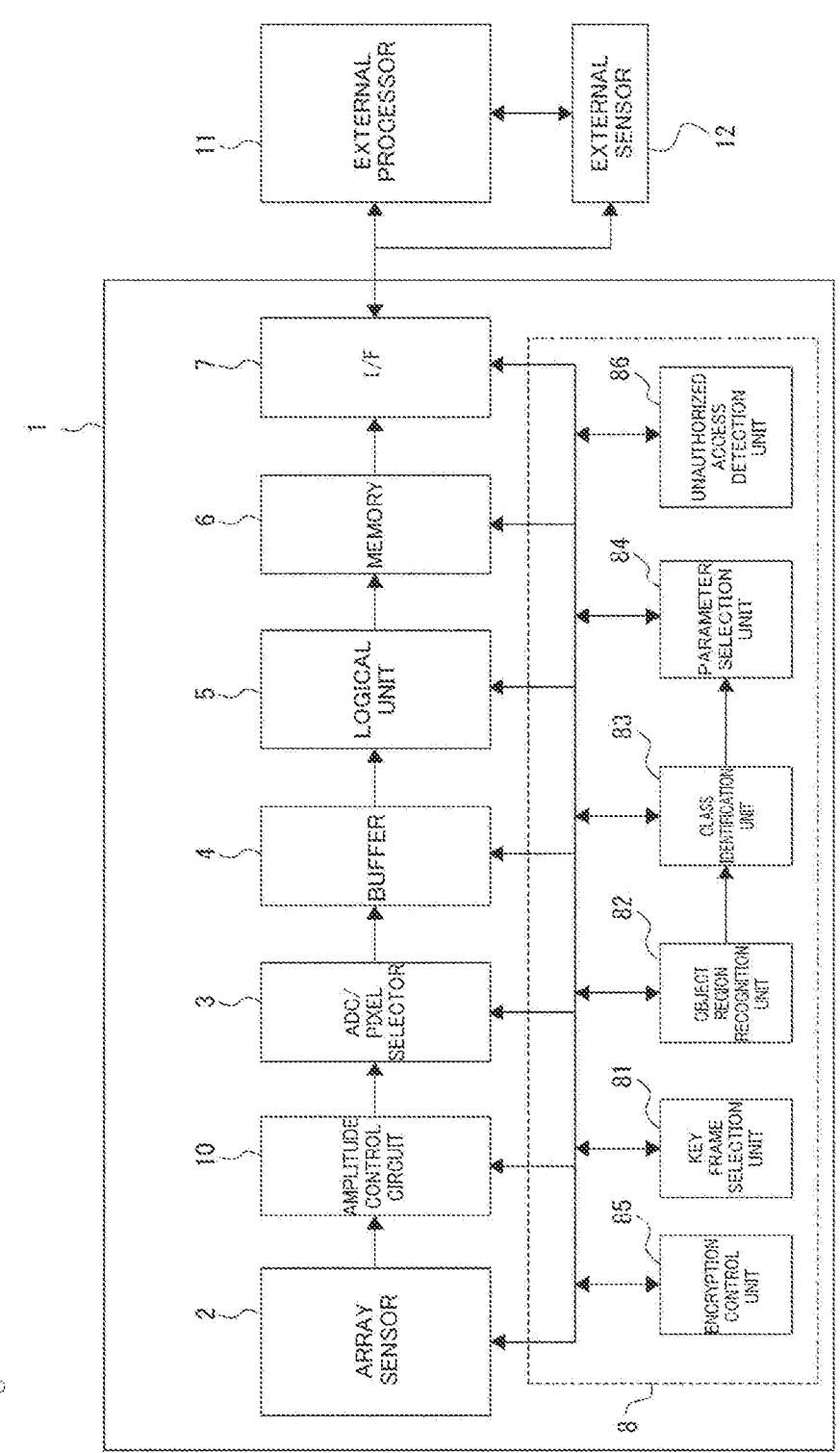
FIG. 1 is a block diagram illustrating a sensor device according to an embodiment of the present technology.

A configuration example of the sensor device 1 is illustrated in FIG. 1. In FIG. 1, an external processor 11 and an external sensor 12 are also illustrated as external devices that perform data communication with the sensor device 1. The external processor 11 is assumed to be a general-purpose processor connected for communication with the sensor device 1.

The sensor device 1 includes units configured as an image sensor device, a memory device such as a dynamic random access memory (DRAM), and an artificial intelligence (AI) function processor as hardware. As an integrated device, for example, the three units have a 3-layer stacked structure, have a so-called 1-layer flat configuration, or have a 2-layer stacked structure (for example, the memory device and the AI function processor are in the same layer).

In FIG. 1, the sensor device 1 includes an array sensor 2, an amplitude control circuit 10, an analog-to-digital converter (ADC)/pixel selector 3, a buffer 4, a logical unit 5, a memory 6, an interface unit 7, and a calculation unit 8.

The array sensor 2 is configured such that detection elements are light-receiving elements for visible light or invisible light and a plurality of pixels including the light-receiving elements are arrayed 1-dimensionally or 2-dimensionally. For example, many pixels are arrayed 2-dimensionally in the row and column directions and 2-dimensional image signals are output through photoelectric conversion in the light-receiving elements of the pixels.

In the following description, the array sensor 2 is assumed to be an image sensor that outputs a 2-dimensional image signal. However, the array sensor 2 in the sensor device 1 can also be configured as a sensor array module in which acoustic wave detection elements are arrayed, a sensor array module in which tactile information detection elements are arrayed, or the like.

The amplitude control circuit 10 performs amplitude control of an electrical signal (an analog signal) photoelectrically converted by the array sensor 2. In this example, the amplitude control circuit 10 is configured to be able to change an amplitude ratio based on an instruction from the calculation unit 8, and this point will be described later.

The electrical signal photoelectrically converted by the array sensor 2 is input to the ADC/pixel selector 3 via the amplitude control circuit 10. The ADC/pixel selector 3 converts the electrical signal which is the input analog signal into digital data and outputs an image signal as the digital data.

The ADC/pixel selector 3 has a pixel selection function for pixels (image sensor) of the array sensor 2. Thus, a photoelectrically converted signal can be acquired for only a selected pixel in the array sensor 2, can be converted into digital data, and can be output. That is, the ADC/pixel selector 3 normally converts photoelectrically converted signals for all the effective pixels forming an image of one frame into digital data and outputs the digital data, but can also convert photoelectrically converted signals for only selected pixels into digital data and output the digital data.

The ADC/pixel selector 3 acquires the image signal in units of frames. The image signal of each frame is temporarily stored in the buffer 4, is read at an appropriate timing, and is supplied for a process of the logical unit 5.

The logical unit 5 performs various kinds of necessary signal processing (image processing) on each of the input frame image signals.

For example, the logical unit 5 is assumed to adjust image quality through processes such as color correction, gamma correction, color gradation processing, gain processing, and a contour enhancement process. The logical unit 5 is also assumed to perform a process of changing a data size, such as a data compression process, resolution conversion, or frame rate conversion.

In each process performed by the logical unit 5, a parameter used for each process is set. For example, there are setting values such as a gain value, a compression ratio, a frame rate, and a correction coefficient of color or luminance. The logical unit 5 performs a necessary process using the parameter set for each process. In the embodiment, the parameters are set by the calculation unit 8 in some cases.

An image signal processed by the logical unit 5 is stored in the memory 6 configured as, for example, a DRAM.

As the memory 6, a DRAM, a static random access memory (SRAM), a magnetoresistive random access memory (MRAM), or the like is assumed. The MRAM is a memory that stores data by magnetism and it is known that a tunneling magnetoresistive (TMR) element is used instead of a magnetic core. In a TMR element, a very thin layer of an insulating material corresponding to several atoms is interposed by magnetic substances so that electrical resistance varies in accordance with a direction of magnetization of the layers of the magnetic substances. A direction of magnetization of the TMR element does not vary even when power is cut off, and thus a nonvolatile memory is realized. A larger write current is necessary with further micronization. Therefore, a spin torque transfer (STT)-MRAM in which, in order to realize micronization of a memory cell, STT is used to flow and write electrons of which spin is complete without using a magnetic field is known. Of course, another storage element may be used as a specific example of the memory 6.

An image signal stored in the memory 6 is transmitted and output at a necessary timing to the external processor 11 or the like by the interface unit 7.

The external processor 11 performs image analysis and an image recognition process on an image signal transmitted from the sensor device 1 to perform necessary object detection or the like.

The external processor 11 can also refer to detection information of the external sensor 12.

Here, it is considered that the external processor 11 is connected to the sensor device 1 in a wired or wireless manner.

An imaging device that includes the sensor device 1 has a network communication function and is also configured to be able to transmit an image signal obtained by the sensor device 1 (a captured image signal) to an external computer device (for example, a cloud server or the like) of the imaging device via a network such as the Internet or a local area network (LAN). For example, in this case, the external processor 11 is considered to be, for example, a processor in a cloud computing system in some cases.

The calculation unit 8 is configured as, for example, a single AI processor. The calculation unit 8 includes a key frame selection unit 81, an object region recognition unit 82, a class identification unit 83, a parameter selection unit 84, an encryption control unit 85, and an unauthorized access detection unit 86, as illustrated, as executable calculation functions. These calculation functions may be configured by a plurality of processors.

The key frame selection unit 81 performs a process of selecting a key frame from frames of an image signal serving as a moving image in response to a predetermined algorithm or an instruction.

The object region recognition unit 82 detects a region of an object which is a detection candidate in the frame of the image signal photoelectrically converted by the array sensor 2 and acquired by the ADC/pixel selector 3 or performs a recognition process of a region (a bounding box) surrounding a detection target object in an image (a frame) of this object.

The object detected from the image signal is an object which is a detection target for the purpose of recognition from an image. A detection target object differs in accordance with a detection purpose, a processing capability, a kind of application, or the like of the sensor device 1 or the external processor 11. However, there is a possibility of all objects being detection target objects mentioned herein. As some of the objects, animals, moving objects (automobiles, bicycles, airplanes, and the like), natural objects (vegetables, plants, and the like), industrial products/components, buildings, facilities, mountains, seas, rivers, stars, the sun, and clouds can be exemplified.

In this example, the object region recognition unit 82 performs a process of calculating a region of interest (ROI) which is region information indicating a processing target region (a region of interest) based on the bounding box.

The class identification unit 83 sorts a class of an object detected by the object region recognition unit 82.

The class is information indicating a category of an object. For example, objects to be detected are classified into "people," "automobiles," "airplanes," "ships," "trucks," "birds," "cats," "dogs," "deer," "frogs," "horses," etc.

The parameter selection unit 84 stores parameters for signal processing in accordance with each class and selects a corresponding single parameter or a plurality of corresponding parameters using a class of a detected object identified by the class identification unit 83, the bounding box, or the like. The single parameter or the plurality of parameters are set in the logical unit 5.

Here, processes of various functions by the foregoing calculation unit 8 are processes not normally performed in the image sensor. In the embodiment, object detection, class recognition, and control based on the object detection and the class recognition are performed inside the image sensor. Thus, an image signal to be supplied to the external processor 11 can be set to be appropriate in accordance with a detection purpose, or an amount of data can be appropriately reduced so that the detection capability does not deteriorate.

The encryption control unit 85 performs control such that the image signal obtained through imaging in the array sensor 2 is encrypted. A specific example of a process performed by the encryption control unit 85 to encrypt the image signal will be described again.

The unauthorized access detection unit 86 detects unauthorized access from the outside of the sensor device 1. Specifically, the unauthorized access detection unit 86 in this example detects unauthorized access to data stored in the memory 6 from the outside.

When the unauthorized access detection unit 86 detects unauthorized access, log information (for example, information or the like indicating a detection date and time or a kind of unauthorized access) is recorded in a predetermined region of the memory 6.

1-2. Random Number Used for Encryption

Here, the sensor device 1 according to the embodiment encrypts the image signal. In the related art, pseudorandom numbers generated by software are used as random numbers used for encryption in many cases. However, a pseudorandom number is generated by an algorithm for calculating a numerical value, and a true random number cannot be generated. Therefore, there is a risk of deciphering and replicating an encryption key.

In consideration of this point, a photoelectric random number is used to generate an encryption key in the embodiment.

The photoelectric random number is a random number obtained based on photoelectric conversion by the array sensor 2. Specifically, in this example, a value of an electrical signal of each pixel obtained through the photoelectric conversion of the array sensor 2 is acquired as a photoelectric random number to generate an encryption key.

Figure 2:
FIG. 2 is a diagram illustrating an example of a scheme of generating an encryption filter (an encryption key) based on a photoelectric random number.

FIG. 2 illustrates an example of a scheme of generating an encryption filter (an encryption key) based on a photoelectric random number.

First, values of electrical signals of pixels obtained through the photoelectric conversion of the array sensor 2 are exemplified on the left side of the drawing. Specifically, in this example, each pixel value (luminance value) of an image (a still image) obtained through imaging in the array sensor 2 is used as a photoelectric random number.

Hereinafter, a frame image captured to obtain a photoelectric random number, in other words, a frame image which is an origin of the photoelectric random number, is referred to as a "seed frame" here.

In this example, the values of the electrical signals of the pixels are not used as an encryption key, but an encryption key is generated in a format in which at least some of the values of the electrical signals of the pixels are assigned to pixel positions different from pixel positions at which the values of the electrical signals are obtained, as exemplified on the right side of the drawing. In other words, the encryption key is generated by shuffling the pixel positions with respect to the values of the electrical signals of the pixels obtained as the photoelectric random numbers.

Thus, it is possible to improve security because it is difficult to decipher the encryption key, compared to a case where an encryption key in which values of electrical signals of pixels are assigned to pixel positions at which the values of the electrical signals are obtained, as they are, is used.

Here, in the generation of the encryption key, the values of the electric signals of the pixels can also be modulated and used by a predetermined algorithm. For example, a value obtained by multiplying the value of the electric signal of each pixel by a predetermined coefficient is exemplified as a random number of that pixel. Alternatively, when the value of the electrical signal of each pixel contains a value after a decimal point, it is possible to adopt a scheme of setting a value obtained as an integer of the value after the decimal point as a random number at that pixel position.

In the generation of the encryption key, it is not essential to shuffle the foregoing pixel positions, and the value of the electric signal of each pixel can also be used an encryption key.

1-3. Processing Target Signal

In the related art, when an image signal obtained through imaging in the array sensor 2 is encrypted, generally, an image signal read from the array sensor 2 is temporarily stored in a plain text state in the memory and the stored image signal is encrypted.

However, when such an encryption scheme is adopted, hacking by causing an error to arise intentionally at a timing of encryption using malware or the like, outputting memory content as a dump file, and copying plain text put on a memory becomes possible.

Accordingly, in the embodiment, an image signal is not stored in plain text in the memory because signals read from the pixels of the array sensor 2 are encrypted. Specifically, in this example, the amplitude control circuit 10 illustrated in FIG. 1 performs amplitude control on the signal read from the pixels of the array sensor 2 with the coefficient in accordance with the encryption key illustrated in FIG. 2, and thus the encryption of the read signal is realized.

Figure 3:
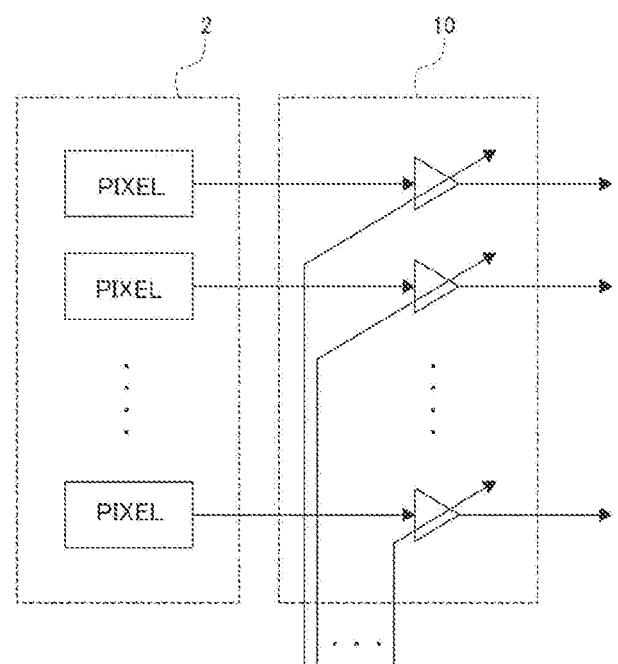
FIG. 3 is a diagram illustrating an image of encryption of a read signal by an amplitude control circuit according to an embodiment.

FIG. 3 is a diagram illustrating an image of encryption of a read signal by the amplitude control circuit 10.

As illustrated, the signal read from each pixel in the array sensor 2 (in this case, a charge signal) is multiplied by the coefficient in accordance with the encryption key by an amplifier included in the amplitude control circuit 10. In the sensor device 1 illustrated in FIG. 1, the amplitude of the read signal of each pixel is controlled in an analog signal stage in this way, and the read signal is subjected to A/D conversion by the ADC/pixel selector 3 and is stored in the memory 6 via the buffer 4 and the logical unit 5.

The encryption control unit 85 encrypts the signal read from each pixel in the array sensor 2 by setting the coefficient in accordance with the encryption key in the amplifier.

FIG. 3 is merely an image diagram and it is not essential to provide the amplifier at each pixel in the amplitude control circuit 10. For example, when collective reading is performed as in a charge-coupled device (CCD) image sensor, the amplifier included in the amplitude control circuit 10 is one amplifier common to each pixel in some cases. In this case, the amplitude control of each pixel is performed in a time division manner.

Here, a read signal of an individual pixel can be said to be a signal that forms an image signal. That is, the read signal of the individual pixel belongs to the image signal in the sense that the read signal is a signal that forms a part of the image signal.

The example in which the read signal is encrypted in accordance with an analog signal has been described above as an example of encryption of the read signal. However, the read signal can also be encrypted in accordance with a digital signal after A/D conversion.

Figure 4:
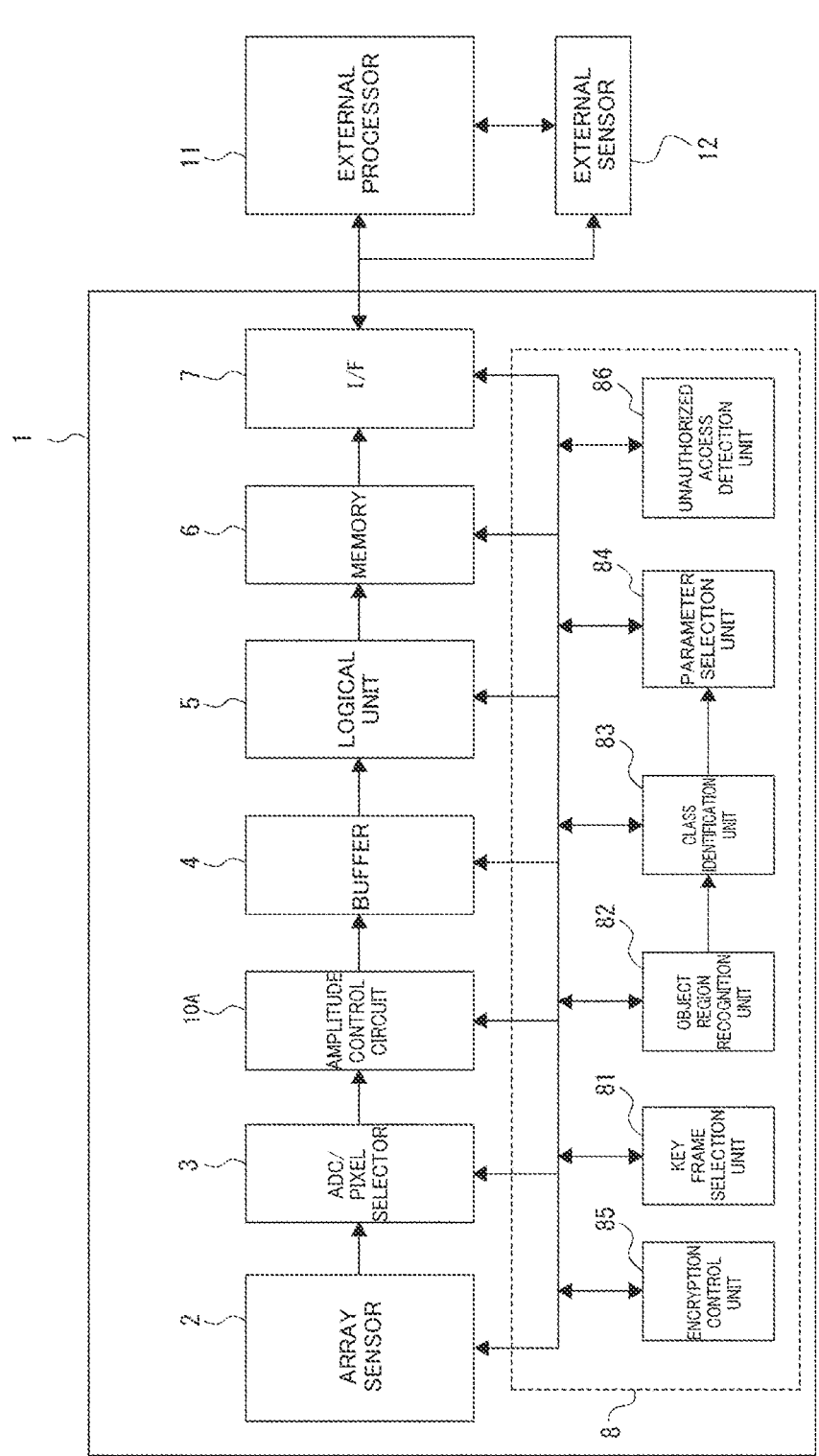
FIG. 4 is a diagram illustrating a configuration example of the sensor device when the read signal is encrypted using a digital signal.

FIG. 4 is a diagram illustrating a configuration example of the sensor device 1 when the read signal is encrypted using a digital signal.

In this case, the sensor device 1 includes an amplitude control circuit 10A that performs amplitude control on a read signal converted into a digital signal by the ADC/pixel selector 3 instead of the amplitude control circuit 10.

In this case, a process by the encryption control unit 85 is the same except that a coefficient setting target of each pixel in accordance with the encryption key is changed from the amplitude control circuit 10 to the amplitude control circuit 10A. Therefore, repeated description will be avoided.

Here, when an analog read signal is encrypted, as described above, unauthorized acquisition of the analog signal from the outside is very difficult. Therefore, it is possible to achieve an improvement in security.

When the analog read signal is encrypted, there is concern of reproduction of an image deteriorating with regard to an image obtained by decoding an encrypted image.

However, for example, when a target image is used to analyze an attribute or an action of a target such as a person, the target can be detected or analyzed as reproducibility of the image and it is considered that a practical problem does not occur.

On the other hand, when a digital read signal is encrypted, accuracy of the encryption process can be improved and reproducibility of an image can be improved.

Here, the foregoing encryption performed on the read signal is a kind of encryption in accordance with a stream encryption scheme. The stream encryption scheme is an encryption method of encrypting plain text in a predetermined data unit such as a bit unit or a byte unit.

In the stream encryption scheme, it is not necessary to align the length of data with regard to an encryption target signal. Therefore, it is not necessary to perform preprocessing of the encryption on a target signal. Accordingly, by adopting the stream encryption scheme, it is possible to speed up the encryption process.

1-4. Tamper Resistance

Figure 5:
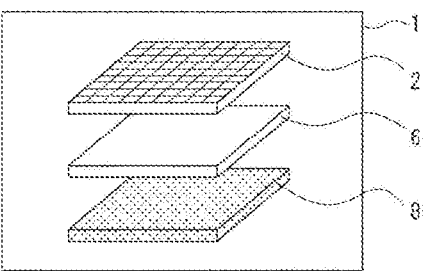
FIG. 5 is a diagram illustrating an example of the structure of the sensor device according to the embodiment.

In this example, the sensor device 1 achieves tamper resistance in terms of hardware. As exemplified in FIG. 5, chips of the array sensor 2, the memory 6, and the calculation unit 8 are packaged as one. In the example of FIG. 5, a chip serving as the memory 6 is stacked on a chip serving as the calculation unit 8 and a chip serving as the array sensor 2 is further stacked on the chip serving as the memory 6.

In this example, an encryption unit that encrypts a read signal is formed, for example, inside the chip serving as the array sensor 2.

The encryption control unit 85 that generates an encryption key based on the photoelectric random number and causes the encryption unit to perform encryption based on the encryption key is included in the chip serving as the calculation unit 8.

In this example, electric connection of each chip is performed by Cu—Cu connection to connect pads made of Cu (copper) and such electrical connection portions are broken down by decomposing the sensor device 1. That is, tamper resistance can be achieved in terms of hardware.

Figure 6:
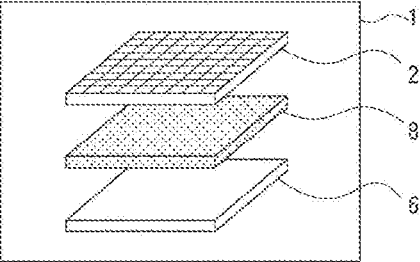
FIG. 6 is a diagram illustrating another example of the structure of the sensor device according to the embodiment.

FIG. 6 is a diagram illustrating another example of the structure of the sensor device 1. A difference from FIG. 5 is reversion of a hierarchical relation between the calculation unit 8 and the memory 6.

Figure 7:
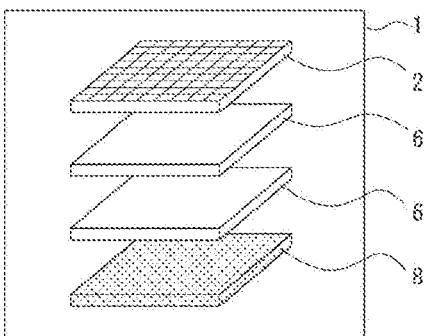
FIG. 7 is a diagram illustrating still another example of the structure of the sensor device according to the embodiment.

FIG. 7 is a diagram illustrating still another example of the sensor device 1. A difference from FIG. 5 is that a plurality of chips serving as the memory 6 are stacked (two layers in the illustrated example).

Although not illustrated, in the sensor device 1, the memory 6 can be formed in the same layer as the calculation unit 8 as a structure of two layers or the array sensor 2, the memory 6, and the calculation unit 8 can also be formed in the same layer as a structure of one layer.

By adopting one packaged configuration exemplified from FIGS. 5 to 7, it is possible to take countermeasures to improve resistance to unauthorized information acquisition from the memory 6 because of decomposition such as the above-described Cu—Cu connection, and thus it is possible to achieve tamper resistance in terms of hardware.

1-5. Processing Procedure

Next, a procedure of a process performed by the calculation unit 8 to realize encryption according to the above-described first embodiment will be described with reference to the flowchart of FIG. 8.

At least some of the processes to be described below can also be realized as processes by hardware.

Figure 8:
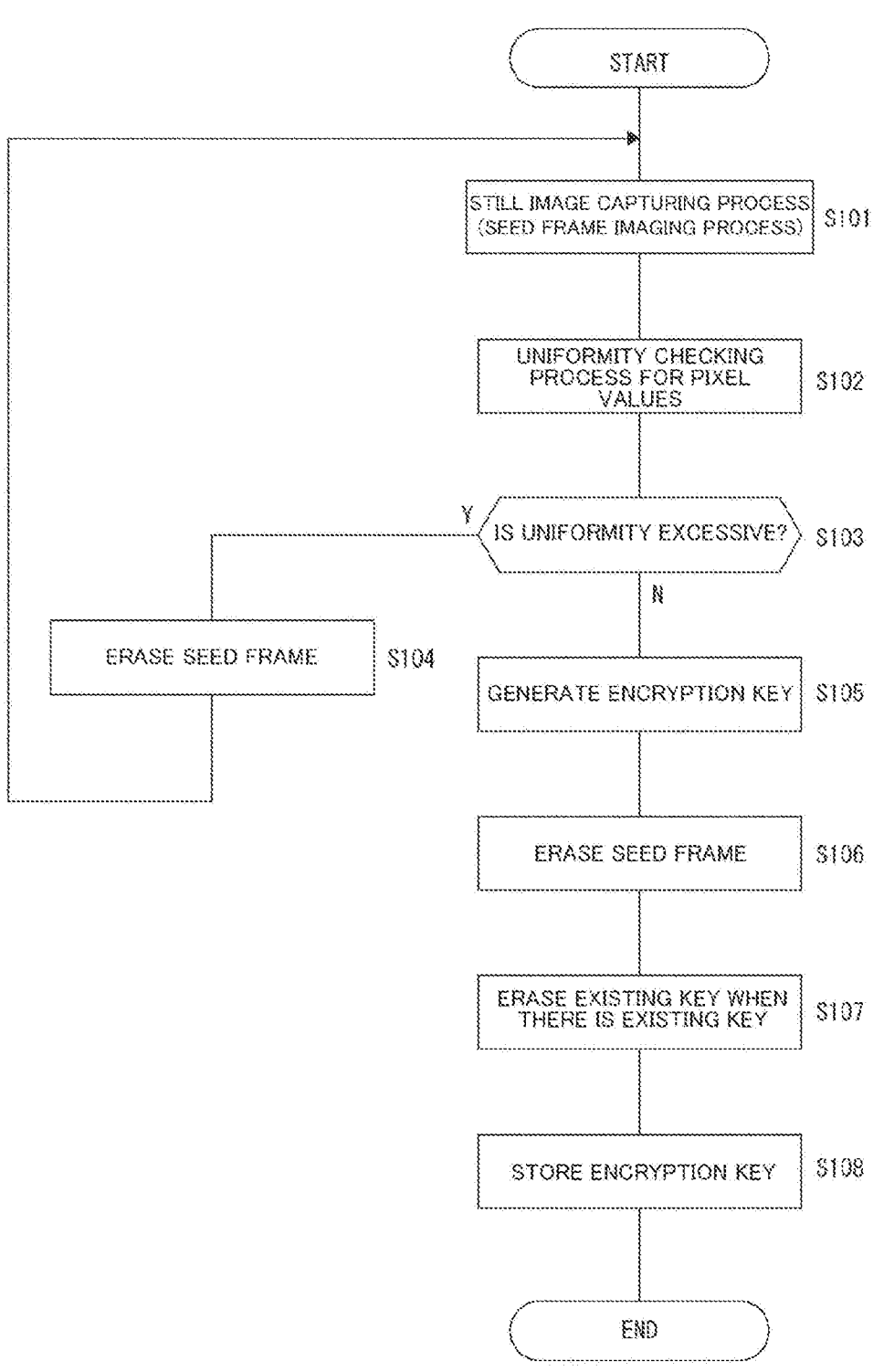
FIG. 8 is a flowchart illustrating a procedure of a process performed to realize encryption according to a first embodiment.

First, as the premise, the calculation unit 8 starts the process illustrated in FIG. 8 in response to activation and detection of an unauthorized access by the unauthorized access detection unit 86.

By starting the process illustrated in FIG. 8 in response to the detection of the unauthorized access, acquisition of the photoelectric random number (S101) or generation of the encryption key (S105) is performed in response to the detection of the unauthorized access. That is, the photoelectric random number is re-acquired in response to the detection of the unauthorized access and the encryption key is re-generated based on the re-acquired photoelectric random number. Thus, it is possible to achieve tamper resistance in terms of software. The process illustrated in FIG. 8 can also be started based on another condition. For example, the process can be started in response to an instruction (for example, an instruction in accordance with an operation input) from the outside or every given interval.

In FIG. 8, the calculation unit 8 performs a still image capturing process of in step S101. The still image capturing process is a process of capturing still images which are an origin of generation of the encryption key. The calculation unit 8 controls the array sensor 2 such that images corresponding to one frame are captured (charges of each pixel are read).

Hereinafter, images (still images) corresponding to one frame which are an origin of the generation of the encryption key are referred to as a "seed frame" here. When the still image capturing process is performed in step S101, image data is stored as the seed frame in the memory 6.

In step S102 subsequent to step S101, the calculation unit 8 performs a uniformity checking process for pixel values. The uniformity checking process is a process of checking uniformity of luminance values of the pixels in the seed frame. Specifically, the calculation unit 8 counts the number of pixels of which luminance values are zero or a satirized value (a maximum value).

As the uniformity checking process for the pixel values, a uniformity checking process in which a value of a read signal is a target can also be performed.

In step S103 subsequent to step S102, the calculation unit 8 determines whether the uniformity is excessive. Specifically, it is determined in step S102 whether the number of counted pixels is equal to or greater than a predetermined threshold (for example, a value corresponding to 30% to 50% of the number of effective pixels).

When it is determined in step S102 the number of counted pixels is equal to or greater than the predetermined threshold and the uniformity is excessive, the process proceeds to step S104 and the calculation unit 8 performs a process of erasing the seed frame, that is, a process of erasing the image data which is the seed frame stored in the memory 6. Then, the process returns to step S101. Thus, the seed frame can be imaged again to correspond to a case where randomness of the pixel values of the seed frame is low. That is, the photoelectric random number can be acquired again to correspond to a case where the randomness of the photoelectric random number is low.

Accordingly, it is possible to prevent encryption with the encryption key based on the random number with low randomness and it is possible to achieve an improvement in security.

Conversely, when it is determined in step S103 that the number of counted pixels is not equal to or greater than the threshold and the uniformity is not excessive, the process proceeds to step S105 and the calculation unit 8 generates the encryption key. Specifically, in this example, based on a luminance value of each pixel in the seed frame, the encryption key indicating a coefficient to be set in each amplifier in the amplitude control circuit 10 (or 10A) is generated.

Here, in this example, in the process of step S105, the encryption key in the format in which the luminance values of the pixels are assigned to the pixel position at which the luminance values are obtained is not generated, but the encryption key in the format in which at least some of the luminance values of the pixels are assigned to pixel positions different from the pixel positions at which the luminance values are obtained is generated.

Thus, it is difficult to decipher the encryption key and it is possible to achieve an improvement in security.

In step S106 subsequent to step S105, the calculation unit 8 performs a process of erasing the seed frame, that is, the process of erasing the image data which is the seed frame stored in the memory 6 through the imaging process of step S101.

By performing the process of erasing the seed frame, it is possible to prevent the photoelectric random number from being estimated due to leaking of the image which is an origin of the photoelectric random number.

For example, when the processing capability of the calculation unit 8 is high or the image size of the seed frame is small, it is not essential to temporarily store the seed frame in the memory 6. In this case, the calculation unit 8 (the encryption control unit 85) receives the photoelectric random number from, for example, the amplitude control circuit 10 (or 10A) and generates the encryption key in step S105 via the processes of steps S102 and S103. In this case, the erasing process of step S106 is unnecessary (of course, the erasing process of step S104 is also unnecessary).

Subsequently, in step S107, there is an existing key, the calculation unit 8 erases the existing key. For example, when the process illustrated in FIG. 8 is started at each given time, the encryption key is stored in the memory 6 through the previously performed process of step S108. The process of step S107 is the process of erasing the encryption key when the existing encryption key is stored in the memory 6 in this way.

By performing the process of erasing the existing key, it is possible to prevent leaking of the encryption key previously used for encryption, and thus it is possible to prevent the previously encrypted signal from being decoded illegally.

Subsequently, in step S108, the calculation unit 8 performs a process of storing the encryption key. That is, the process of storing the encryption key generated in step S105 in the memory 6 is performed.

When the storing process of step S108 is performed, the calculation unit 8 ends the series of processes illustrated in FIG. 8.

In the sensor device 1, the image signal obtained through the imaging in the array sensor 2 is set to a target to perform encryption using the encryption key stored in step S108. Specifically, after the calculation unit 8 (the encryption control unit 85) ends the process illustrated in FIG. 8, the coefficient of each pixel based on the stored encryption key is set in each amplifier in the amplitude control circuit 10 (or 10A) and the encryption based on the encryption key stored in the image signal obtained through the imaging in the array sensor 2 is performed.

In this example, the array sensor 2 performs imaging a moving image, and each frame image that forms a moving image is encrypted by the amplitude control circuit 10 (or 10A).

Here, as understood from the above description, in this example, the image signal is encrypted based on the photoelectric random number obtained during the frame period different from that of an encryption target image signal.

Thus, it is possible to increase difficulty in estimating the encryption key from the encrypted image, and thus it is possible to achieve an improvement in security.

It is also possible to encrypt the image signal based on the photoelectric random number obtained during the same frame period as that of the encryption target image signal.

1-6. Output Information of Sensor Device

Here, the calculation unit 8 analyzes an attribute or an operation of a target object, specifically, an object of a target class among the above-described classes. For example, when images obtained through imaging in the array sensor 2 are monitored images in stores, attributes such as the number of target customers (people), sex, ages, heights, and weights of the customers, presence or absence of glasses, or prevention or non-prevention can be analyzed, or actions of customers such as changes in postures or movement trajectories (traffic lines) of the customers in the store can be analyzed by analyzing the images.

Alternatively, when images obtained through imaging in the array sensor 2 are monitored images of vehicles traveling on roads, attributes such as models or colors of target vehicles, the number of passengers, and sex of the passengers can be analyzed or actions such as traffic lines and vehicle speeds on roads can be analyzed.

Figure 9:
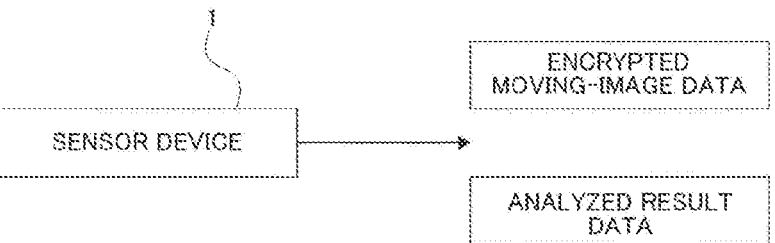
FIG. 9 is a diagram illustrating an output of analysis result data according to the first embodiment.

As illustrated in FIG. 9, a configuration in which moving-image data subjected to encryption in the above-described embodiment (in the drawing, "encrypted moving-image data") and data indicating a result of the analysis (in the drawing, "analyzed result data") are output to the external processor 11 can be adopted in the sensor device 1.

At this time, the interface unit 7 can output the analyzed result data as metadata of the encrypted moving-image data. Alternatively, the analyzed result data can be output independently from the encrypted moving-image data.

With regard to the analyzed result data, for example, it can be considered that the side of the external processor 11 gives an instruction of necessary information to the interface unit 7 and the interface unit 7 outputs information in accordance with the information.

Here, in the encryption scheme of this example, the encryption is performed at the time of the read signal. Therefore, for the calculation unit 8 to perform the object detection or analysis, it is necessary to decode the encrypted image signal. In this example, the calculation unit 8 performs the object detection or analysis process while decoding the encrypted image data stored in the memory 6 in the on-the-fly scheme. The on-the-fly scheme is a scheme of processing encrypted data while decoding the encrypted data in a byte unit or a word unit.

Thus, it is possible to reduce a possibility of an image signal in a plain state leaking when an object is detected from an image or the detected object is analyzed, and thus it is possible to achieve an improvement in security.

1-7. Delivery of Key

Figure 10:
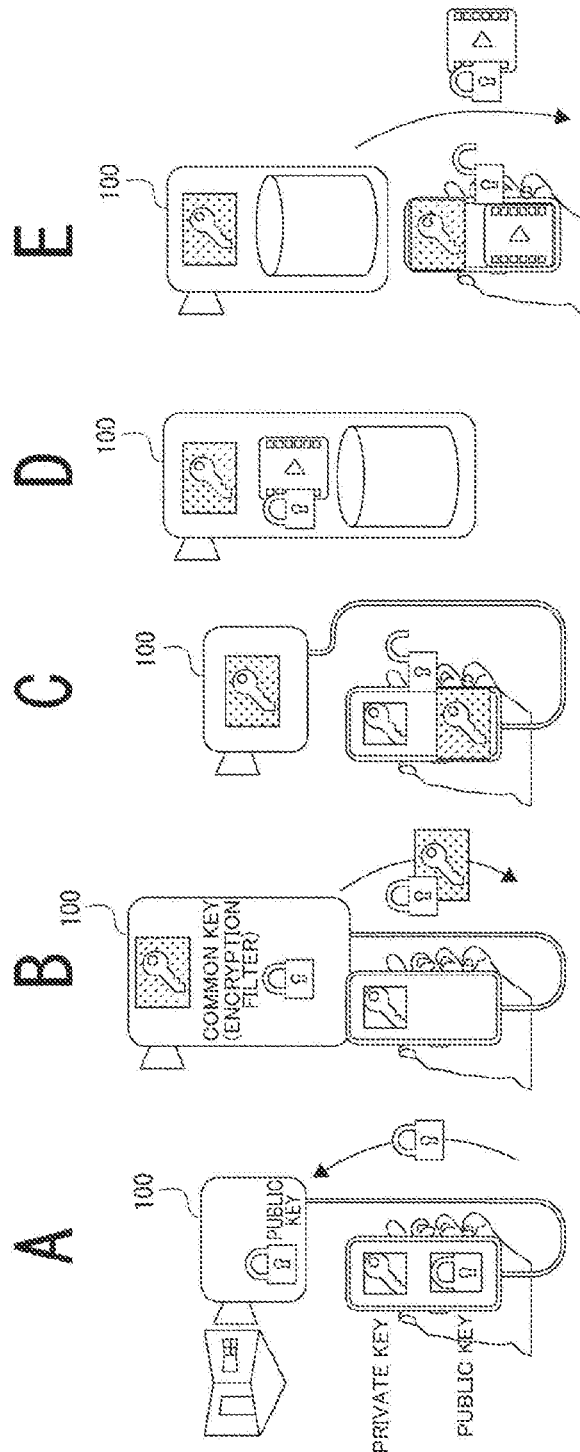
FIG. 10 is a diagram illustrating an example of a scheme of securely delivering a decoding key to an image receiver side.

An example of a scheme of securely delivering a decoding key to an image receiver side will be described with reference to FIG. 10. The scheme is a scheme of delivering a common key using encryption of a public key.

First, the image receiver side generates a public key and a private key and delivers the public key to a camera device 100 including the sensor device 1 (see FIG. 10A).

The side of the camera device 100 acquiring the public key sets an encryption key generated based on the above-described photoelectric random number as a common key, encrypts the common key with the public key, and transmits the encrypted common key to the image receiver side (see FIG. 10B).

Then, the image receiver side decodes the transmitted common key (a decoded key) using the private key generated in FIG. 10A (see FIG. 10C).

Thus, thereafter, the image receiver side can decode the encrypted moving-image data received from the camera device 100 using the decoded common key at a high speed. FIG. 10D schematically illustrates a situation in which an image is encrypted using the common key on the side of the camera device 100. FIG. 10E schematically illustrates a situation in which the image data encrypted with the common key is decoded using the common key on the image receiver side.

In the encryption of the common key with the public key in FIG. 10B and the decoding of a private key of the common key in FIG. 10C, a time of about several seconds is necessary. However, the encryption and the decoding are merely performed only once in the delivery of one key.

2. Second Embodiment

2-1. Encryption Scheme of Second Embodiment

Next, an encryption scheme will be described according to a second embodiment. In the following description, the same reference numerals are given to portions similar to the above-described portions and description thereof will be omitted. In the second embodiment, since the configuration of the sensor device 1 is similar to the configuration illustrated in FIG. 1, repeated description thereof will be avoided.

In the second embodiment, encryption of a target region in an image signal is performed.

Specifically, in the second embodiment, encryption based on an encryption key different between an entire image and a target region is performed. By performing encryption based on an encryption key different between a region of a specific portion and the other region of the target region, a concealing level of information is changed step by step separately in accordance with a decoding key retained on the image receiver side.

Figure 11:
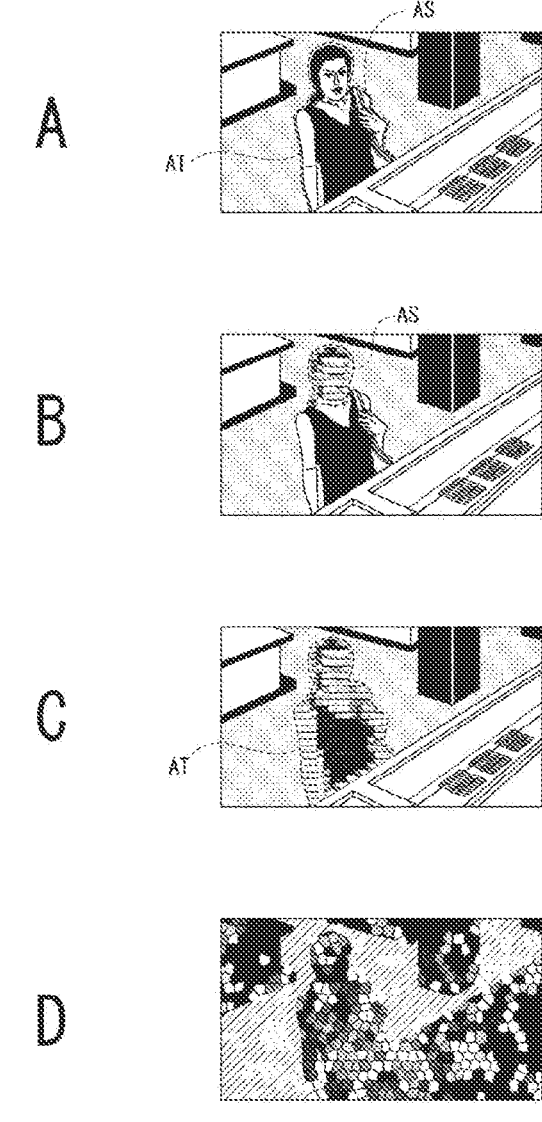
FIG. 11 is a diagram illustrating an image of stepwise encryption when a target class is a person.
Figure 12:
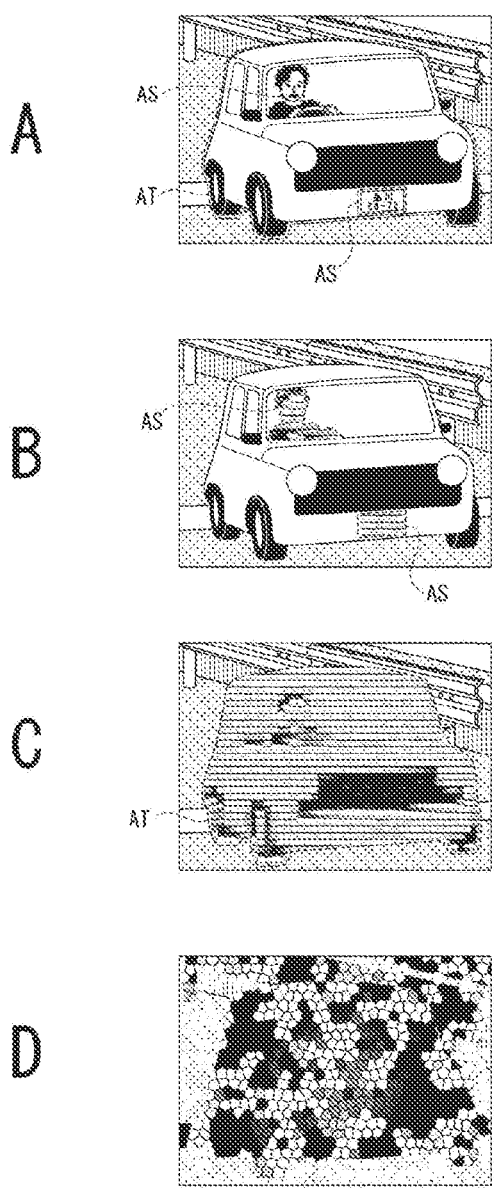
FIG. 12 is a diagram illustrating an image of stepwise encryption when a target class is a vehicle.

FIGS. 11 and 12 are diagrams illustrating images of stepwise encryption according to the second embodiment.

FIG. 11 illustrates an image of stepwise encryption when a target class is a person.

FIG. 11A illustrates an image before encryption. In this case, a target region AT is an entire region of a portion in which a person is shown in the image. In this case, a specific region AS which is a region of a specific part is a region of the face of the person.

FIG. 11B illustrates an image in which only the specific region AS is encrypted, FIG. 11C, illustrates an image in which only the target region AT including the specific region AS is encrypted, and FIG. 11D illustrates an image in which the entire region of the image is encrypted.

FIG. 12 is a diagram illustrating an image of stepwise encryption when a target class is a vehicle. FIG. 12A illustrates an image before encryption.

In this case, a target region AT is an entire region of a portion in which a vehicle is shown in the image and specific regions AS are regions of passengers of the vehicle and a number plate.

FIG. 12B illustrates an image in which only the specific region AS is encrypted, FIG. 12C illustrates an image in which only the target region AT including the specific regions AS is encrypted, and FIG. 12D illustrates an image in which the entire region of the image is encrypted.

Here, the image before encryption illustrated in FIG. 12A is personal information in which individuals can be specified since both the passengers and the number plate are shown. Therefore, it is not appropriate to use the image for marketing data or the like.

In the image in which only the specific region AS illustrated in FIG. 12B is encrypted, for example, the models or the number of vehicles can be determined for the purpose of marketing of vehicle markers without acquiring information such as the passengers including a driver or the number plate in which individuals can be specified. In the image in which only the target region AT illustrated in FIG. 12C is encrypted, only information regarding the number of vehicles and movements can be acquired without acquiring individual information or model information. For example, a congested situation can be determined.

In the cases of the examples of FIGS. 11 and 12, at least three kinds of encryption keys, a first encryption key corresponding to the encryption of the entire region of the image, a second encryption key corresponding to the encryption of only the target region AT, and a third encryption key corresponding to the encryption of only the specific region AS, are generated as the encryption keys.

Figure 13:
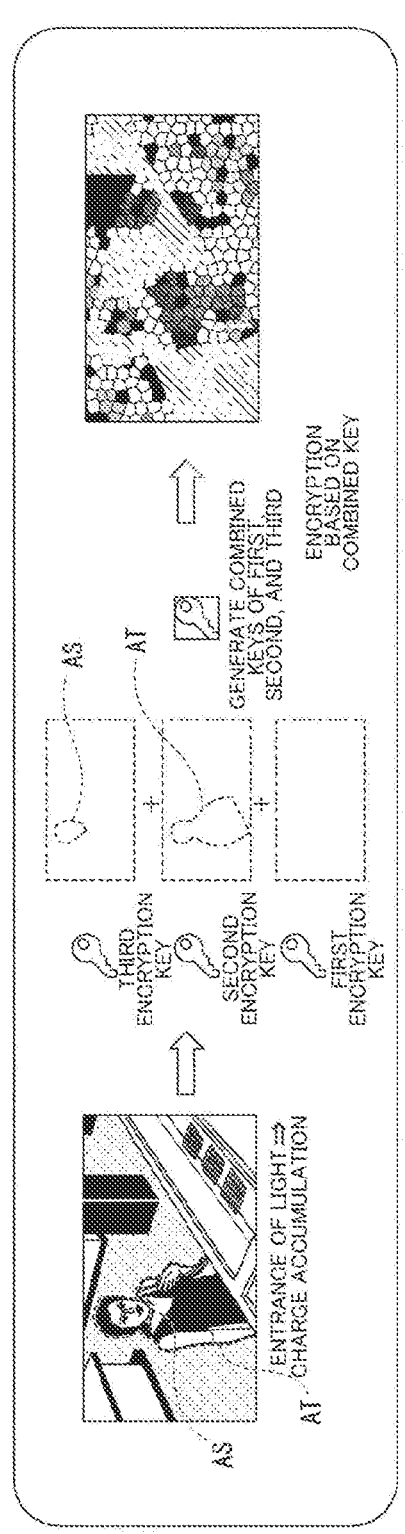
FIG. 13 is a diagram illustrating an example of a specific scheme for stepwise encryption.

FIG. 13 is a diagram illustrating an example of a specific scheme for stepwise encryption.

In this example, without separately encrypting a target image based on the first, second, and third encryption keys, the target image is encrypted based on a combined key in which the plurality of encryption keys are combined.

First, the third encryption key for encrypting the specific region AT, the second encryption key for encrypting the entire region of the target region AT, and the first encryption key for encrypting the entire region of the image are each prepared. When the three kinds of encryption keys are generated, three kinds of photoelectric random numbers may be obtained (that is, three kinds of seed frames may be imaged). In this example, however, the three kinds of encryption keys are generated from a common photoelectric random number to shorten a time necessary to generate the encryption keys. Specifically, in this example, to generate the three kinds of encryption keys, three kinds of random numbers (referred to as first, second, and third random numbers) in which disposition of a numeral value of each pixel is different in the common photoelectric random number are generated.

The third encryption key is generated as an encryption key in which a numerical value of each pixel of the specific region AS is extracted among numeral values of the third random number.

The second encryption key is generated as an encryption key in which a numerical value of each pixel of the target region AT is extracted among numerical values of the second random number.

The first encryption key is generated as an encryption key in which the first random is applied as it is.

Moreover, as illustrated, the encryption key in which first, second, and third encryption keys are combined is generated as the combined key.

The target image is encrypted based on the combined key.

By performing the foregoing stepwise encryption, it is possible to change the concealing level of information separately in accordance with the decoding key retained on the image receiver side.

Figure 14:
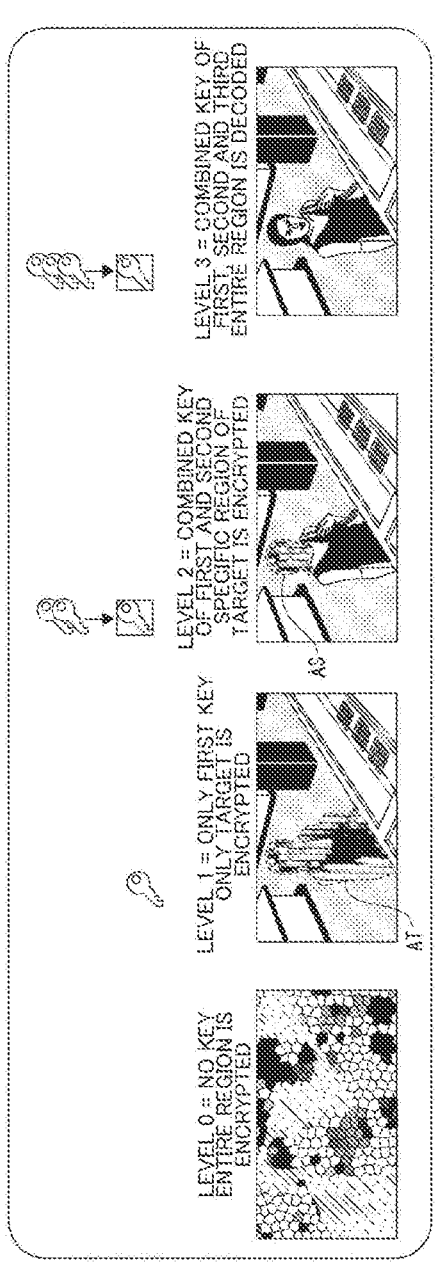
FIG. 14 is a diagram illustrating a change example of a concealing level.

FIG. 14 is a diagram illustrating a change example of a concealing level.

Here, four levels from level 0 to level 3 are defined as levels related to retention of the keys. As illustrated, level 0 means that there is no key, level 1 means that only the first encryption key is retained, level 2 means that a combined key of the first and second encryption keys, level 3 means that a combined key of the first, second, and third encryption keys is retained.

In the case of level 0, on the image receiver side, an image of which the entire region is encrypted can be obtained without decoding an encrypted image.

In the case of level 1, on the image receiver side, a region other than the target region AT can be decoded using the first encryption key. Accordingly, an image in which only the target region AT is encrypted is obtained.

In the case of level 2, on the image receiver side, a region other than the specific region AS can be decoded using the combined key of the first and second encryption keys, and thus an image in which only the specific region AS in a target is encrypted is obtained.

In the case of level 3, on the image receiver side, the entire region of the image can be decoded using the combined key of the first, second, and third encryption keys. In this case, an image with no concealed information can be obtained.

Here, in this example, since the encryption target image is a moving image, an object which is a target shown in the image is likely to be displaced in the image over time. Therefore, when the foregoing target region AT which is a target is encrypted, it is necessary to track the target.

Hereinafter, an example of a specific scheme for encryption in which target tracking is included according to the second embodiment will be described with reference to FIG. 15.

In FIG. 15, the class of a target is a "person." To facilitate description in FIG. 15, an example is given in which a specific region AC and the other region are not distinguished in the target region AT, and only the target region AT in the image and the other region are encrypted and separated.

First, a frame F1 illustrated in FIG. 15A indicates a state in which the person which is the target class is not framed in. Here, an example is given in which an object which is a "tree" and is not a target class is identified in the image.

Here, the entire region of the image is encrypted irrespective of whether there is a target. That is, in this example, an image of each frame F is encrypted in the amplitude control circuit 10 (or 10A) based on the first encryption key corresponding to the entire region of the image, and subsequently is stored in the memory 6. In each divided drawing of FIG. 15, a colored key mark indicates that the entire region of the image which is a target is encrypted as an output image.

To track the target, the calculation unit 8 performs region detection or class identification of a region of an object in the image (the processes of the above-described object region recognition unit 82 and class identification unit 83). To perform such processes, the calculation unit 8 decodes the frame image which has been encrypted and stored. That is, the calculation unit 8 performs a process of tracking a target while decoding the frame image encrypted based on the first encryption key.

The calculation unit 8 performs the decoding at that time in accordance with the on-the-fly scheme. Thus, it is possible to reduce a possibility of an image signal in a plain text state leaking when the target is tracked, and thus it is possible to achieve an improvement in security.

A frame F2 illustrated in FIG. 15B indicates a state in which the "person" who is the target class. In this state, the "person" who is the target class is identified along with the "tree" which has already been identified.

When the object is identified as the target class in this way, the calculation unit 8 (the object region recognition unit 82) calculates a bounding box 20 at accurate position coordinates surrounding an area of the object.

For example, an example of the bounding box 20 of an image of the person who is the target class is illustrated in FIG. 15C. That is, the bounding box 20 is calculated as a more accurate region of the object corresponding to the target class.

Further, the calculation unit 8 (the object region recognition unit 82) calculates an ROI 21 which is a region of interest based on the bounding box 20.

FIG. 15D illustrates the ROI 21 and the bounding box 20. The ROI 21 is calculated, for example, by expanding an aspect ratio (x×y) of the bounding box 20 (ax×by). An expansion scale a and b can be set separately horizontally or vertically. An expansion ratio may be fixed, but can also be considered to be designated from the outside (for example, the external processor 11 or the like) of the sensor device 1.

In this example, the ROI 21 is encrypted as the target region AT using an encryption key different from that of the entire region of the image.

Here, the frame F2 is a frame in which the target class is newly identified in the image and can be restated as a target-class-found frame.

In this example, since the scheme of encrypting signals read from the pixels is adopted, the target-class-found frame cannot be encrypted based on the second encryption key with regard to the ROI 21. The target-class-found frame is already encrypted based on only the first encryption key and is stored in the memory 6. When the target-class-found frame encrypted based on only the first encryption key in this way is output as it is, the image region of the ROI 21 is not concealed and is disclosed to a retainer of only the first encryption key.

Accordingly, in this example, by erasing the target-class-found frame from the memory 6, an appropriate concealing level is realized separately in accordance with a decoding key retained on the image receiver side.

FIG. 15E illustrates a frame F3 which is a frame subsequent to the frame F2. From the frame F subsequent to the target-class-found frame, the ROI 21 is encrypted as a target based on the second encryption key. Here, the ROI 21 is the ROI 21 calculated at the time point of the frame F2 which is the target-class-found frame.

When the "person" who is the target class is moving, the person is moving to a movement direction side from the frame F2 in the frame F3. When the ROI 21 is in a range greater than the bounding box 20, the person who is the target class enters the ROI 21 in the frame F3. That is, the person who is the target class enters a target range of the encryption based on the second encryption key.

After the frame F3, the bounding box 20 and the ROI 21 are similarly calculated with regard to the target class. Thus, the target class is tracked (see FIG. 15F). After a frame F4, like the frame F3, the ROI 21 calculated in the immediately previous frame F is encrypted as the target based on the second encryption key (see FIG. 15G).

FIG. 15H illustrates a frame Fn after the "person" who is the target class is framed out. When the target class is framed out, the ROI 21 is not calculated. Therefore, an image of the frame Fn is encrypted based on only the first encryption key.

In the foregoing description, the example in which a rectangular region expanded from the bounding box 20 is the ROI 21 has been described, but the ROI 21 is not limited to the rectangular region.

For example, the ROI 21 may be calculated from the area of the object of the target class using semantic segmentation, that is, object area detection at a pixel level.

Figure 16:
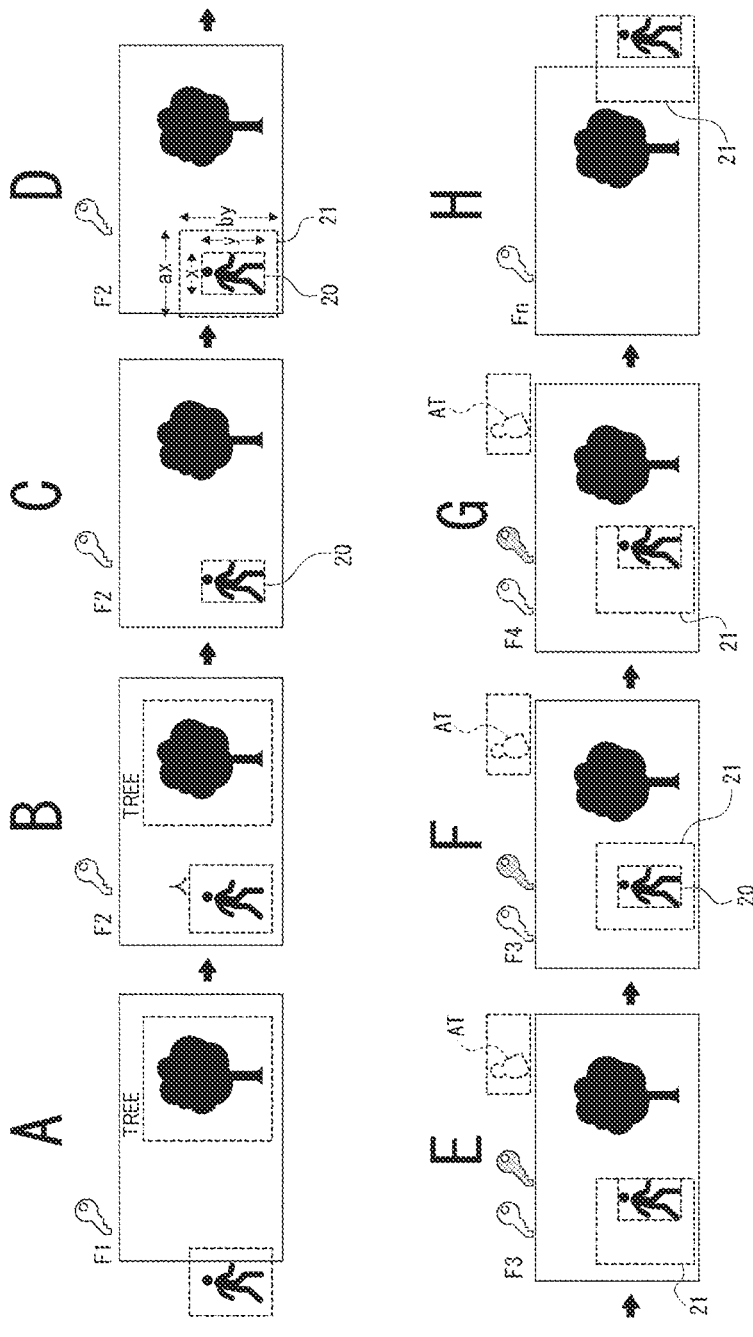
FIG. 16 is a diagram illustrating a modification example of an ROI according to the second embodiment.
Figure 16:
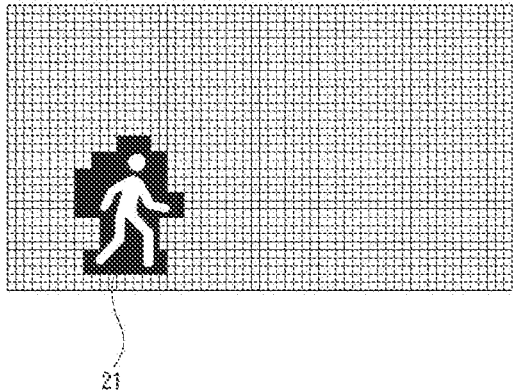

FIG. 16 is a diagram illustrating a modification example of an ROI 21 based on semantic segmentation. This is an example in which a pixel region of an object (for example, a person) is expanded and a nonrectangular ROI 21 is set.

For example, a truck with a protrusion, a person riding a bicycle, or the like is not partially contained or is too large to be contained in the rectangular ROI 21 in some cases. When the nonrectangular ROI 21 is generated in accordance with an object position of a pixel level, a concealing region related to a target can be appropriately set without being excessive or deficient.

2-2. Processing Procedure

A procedure of a process performed by the calculation unit 8 to realize the above-described encryption of the second embodiment will be described with reference to the flowcharts of FIGS. 17 and 18.

Figure 17:
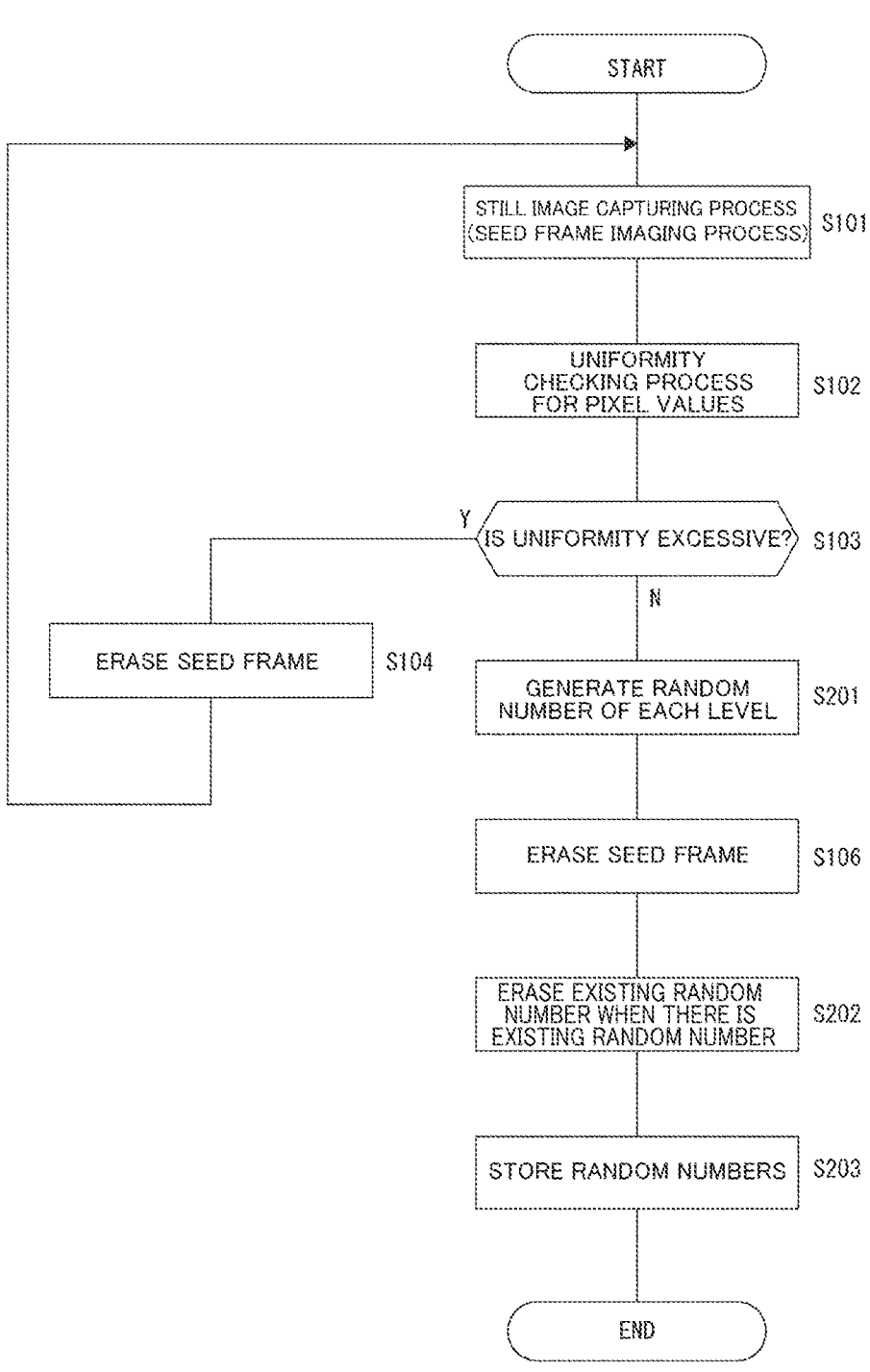
FIG. 17 is a flowchart illustrating a countermeasure process from imaging of a seed frame to storing of a random number which is an origin of an encryption key according to the second embodiment.

FIG. 17 is a flowchart illustrating a countermeasure process from imaging of a seed frame to storing of a random number which is an origin of an encryption key. In FIG. 17, the same step numbers are given to processes similar to the processes described above in FIG. 8, and description thereof will be omitted.

As in the process of FIG. 8, the process illustrated in FIG. 17 is started in response to activation and detection of an unauthorized access by the unauthorized access detection unit 86. Alternatively, the process can also be started based on another condition. For example, the process can be started every given interval.

Figure 18:
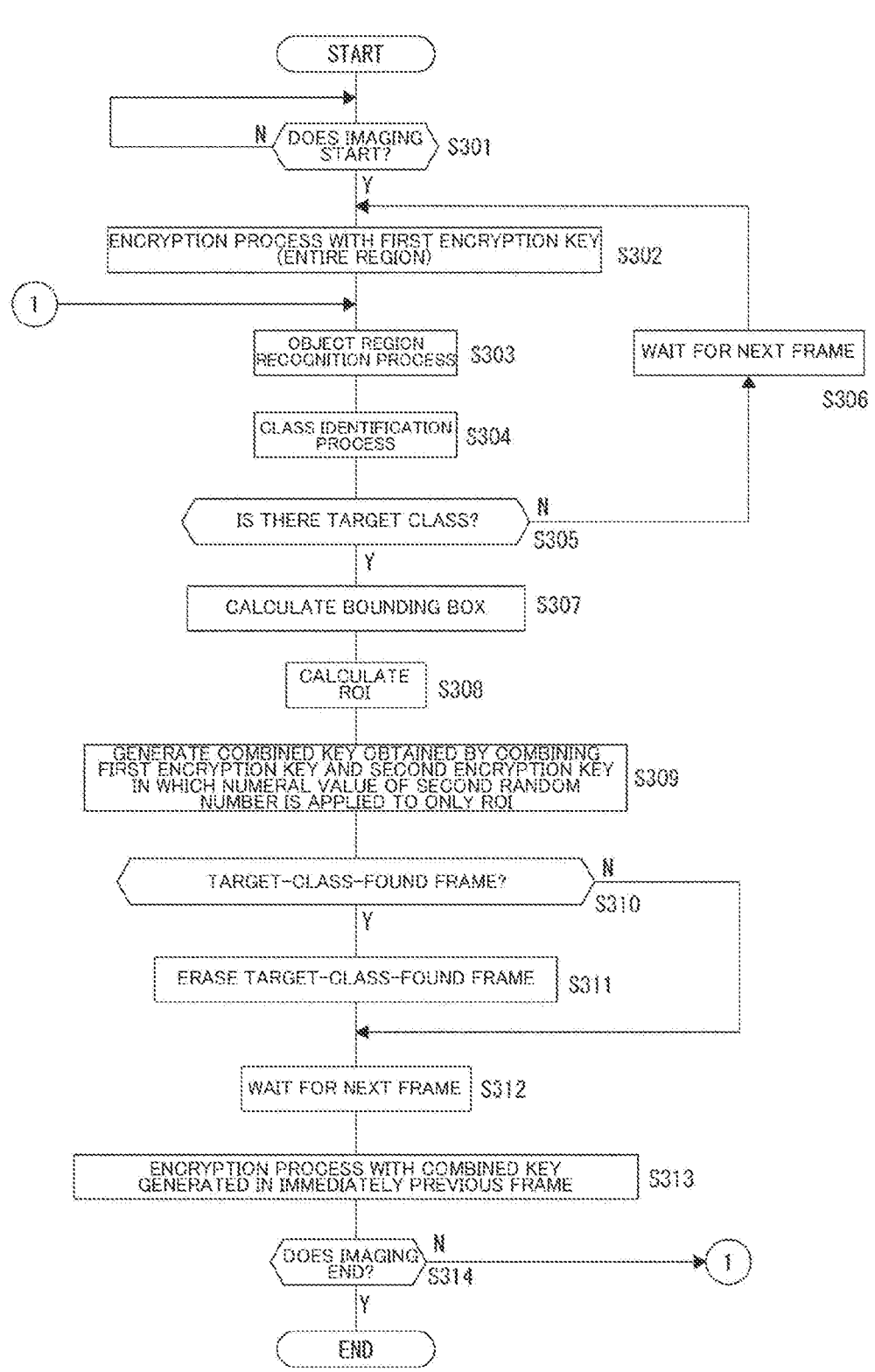
FIG. 18 is a flowchart illustrating a process of encrypting a target image based on a generated encryption key according to the second embodiment.

At least some of the processes described in FIGS. 17 and 18 can also be realized as processes by hardware.

In FIG. 17, in this case, when the uniformity is determined in step S103 to be excessive, the process proceeds to step S201 and the calculation unit 8 generates a random number of each level. Here, since the specific region AS is not distinguished in the target region AT, two kinds of random numbers, the above-described first and second random numbers described as random numbers, are generated.

The scheme of generating various kinds of random numbers based on the photoelectric random number of the seed frame has already been described. Therefore, repeated description thereof will be avoided.

In this case, the calculation unit 8 performs the process of erasing the seed frame in step S106 in response to the random number generating process performed in step S201.

Then, the calculation unit 8 performs a process of erasing an existing random number when there is the existing random number in step S202 in response to the erasing process performed in step S106. That is, the process is a process of erasing random numbers when there are the random numbers of the levels (the first and second random numbers) stored in the memory 6 in the previous performed process of step S203.

In step S203 subsequent to step S202, the calculation unit 8 performs a process of storing the random number of each level generated in step S201 in the memory 6. Then, the series of processes illustrated in FIG. 17 ends.

FIG. 18 is a flowchart illustrating a process of encrypting a target image based on a generated encryption key.

First, the calculation unit 8 waits for a start of imaging of an encryption target image in step S301. When the imaging starts, the calculation unit 8 performs an encryption process with the first encryption key in step S302. That is, the coefficient of each pixel based on the first encryption key is instructed to the amplitude control circuit 10 (or 10A) to encrypt the read signal of the array sensor 2. As understood from the foregoing description, in this example, the first encryption key is an encryption key in which the first random number is applied as it is.

In step S303 subsequent to step S302, the calculation unit 8 performs an object region recognition process. Further, subsequently, in step S304, the calculation unit 8 performs a class identification process. The object region recognition process of step S303 is a process of the above-described object region recognition unit 82. A process of detecting candidate objects from an image of a current frame and regions of the objects is performed. The class identification process of step S304 is a process of the above-described class identification unit 83. The class of the object detected in the object region recognition process is identified. When a plurality of objects or a plurality of kinds of objects are detected, the classes of the objects are identified and the objects are sorted into classes. For example, in the above case of FIG. 15B, the class identification and sorting are performed in such a manner that the number of objects of the class "tree" is one and the number of objects of the class "person" is one.

The calculation unit 8 performs the processes of steps S303 and S304 while decoding the frame image encrypted in step S302 or step S313 to be described below in the on-the-fly scheme.

In step S305 subsequent to step S304, the calculation unit 8 determines whether there is a target class. That is, it is determined whether there is the target class among the classes identified in step S304.

When there is no target class, the calculation unit 8 waits for a next frame (waits for arrival of a next frame period) in step S306, and then the process returns to step S302. That is, until the target class is detected, the encryption process for the entire region of the image in step S302, the object region recognition process in step S303, and the class identification process in step S304 are repeatedly performed for each frame.

When it is determined in step S305 that there is the target class, the process proceeds to step S307 and the calculation unit 8 calculates the bounding box 20. Subsequently, in step S308, the ROI 21 is calculated.

Further, subsequently, in step S309, the calculation unit 8 generates a combined key obtained by combining the first encryption key and the second encryption key in which the numerical value of the second random number is applied to only the ROI 21.

In response to the generation of the combined key in step S309, the calculation unit 8 determines in step S310 whether a current frame is the target-class-found frame. When the current frame is the target-class-found frame, the calculation unit 8 performs a process of erasing the target-class-found frame in step S311. Thus, for the target-class-found frame, it is possible to prevent an image portion of a target from not being concealed irrespective of whether a key retention level is level 1.

When the current frame is not the target-class-found frame in step S310, the calculation unit 8 passes the erasing process of step S311 and performs a process of waiting for a next frame in step S312. When the erasing process of step S311 is performed, the calculation unit 8 performs the process of waiting for the next frame in step S312.

In response to the waiting process performed in step S312, the calculation unit 8 performs the encryption process with the combined key generated in the immediately previous frame in step S313. That is, the coefficient of each pixel based on the combined key is instructed to the amplitude control circuit 10 (or 10A) to encrypt the read signal of the array sensor 2.

In step S314 subsequent to step S313, the calculation unit 8 determines whether the imaging ends, that is, determines whether the imaging of the encryption target image enters an ending state, for example, by giving an instruction to end the imaging from the outside.

When the imaging does not end, the calculation unit 8 returns the process to step S303. In this way, until the imaging ends, the above-described processes are repeated. That is, when there is continuously a target class, the calculation of the ROI with regard to the class target, the generation of the combined key based on the calculated ROI, and the encryption process based on the combined key generated in the previously previous frame are performed. When there is no target class, the encryption process is performed with the first encryption key without performing the encryption process with the combined key.

When the imaging ends, the calculation unit 8 ends the series of processes illustrated in FIG. 18.

In this example, for the ROI 21 is set as a region obtained by expanding the bounding box 20 so that a target object is included in a next frame, but an expansion scale a and b in expansion (a×x×b×y) of the aspect ratio (x×y) can also be considered to correspond to a frame rate.

For example, when the frame rate is low, a time of a frame interval is lengthened and a movement amount of an object such as a person increases. Therefore, it is considered that the ROI 21 is greater than in a case where the frame rate is high.

When the target region AT is encrypted by distinguishing a specific portion and the other region, the bounding box 20 and the ROI 21 are calculated for the specific portion in a scheme similar to the above-described scheme and the third encryption key in which the numerical value of the third random number is applied to the calculated ROI 21 is generated. Moreover, a combined key obtained by combining the first, second, and third encryption keys may be generated and used to encrypt an image of a next frame.

2-3. Output Example of Analysis Information

In the second embodiment, the sensor device 1 can be configured to output the analyzed result data along with the encrypted moving-image data to the outside (see FIG. 9).

At this time, in the second embodiment, the target region AT is encrypted as the target. Thus, the analyzed result data is not limited to data of text and can also be, for example, data displayed as an image, as exemplified in FIG. 19.

Figure 19:
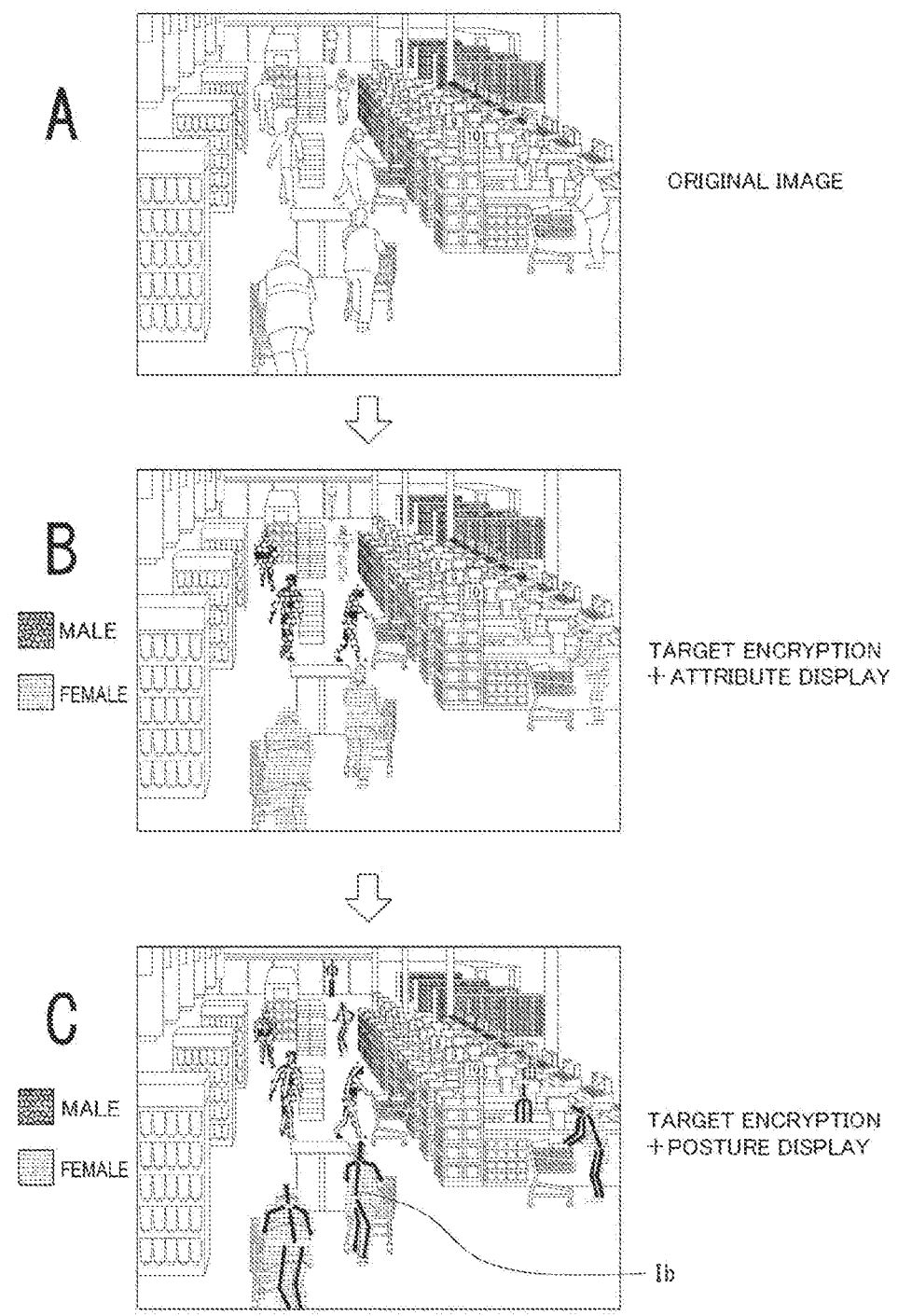
FIG. 19 is a diagram illustrating an output of analysis result data according to the second embodiment.

In FIG. 19, FIG. 19A illustrates an original image before encryption.

In FIG. 19B, as an example in which attribute information analyzed with regard to a target (herein, a "person") is displayed on an image, sex information of the target is displayed separately with a color added to a target region in an encrypted state.

FIG. 19C illustrates an example in which posture information Ib obtained through the target analysis process is further superimposed on the target region in the encrypted state.

In this way, by encrypting the target region as the target, it is possible to supply an image set to ascertain an analysis result of an attribute or an action of the target more easily while guaranteeing concealment of personal information.

In recent years, a camera video in a store is used as marketing data in many cases. In these cases, it is not necessary to specify individual customers who visit the store, and information necessary for attribute analysis, action analysis, or the like of the customers who visit the store is obtained. Data with which individuals can be specified in the state of the image in FIG. 19A is information with high concealment and a system taking countermeasures for high security is necessary, and thus cost may be high. In the image illustrated in FIG. 19B, traffic lines of customers in the store or attributes of males and females can be known, and thus are useful as marketing data. In the image illustrated in FIG. 19C, the postures of the customers can be further recognized. Therefore, actions of customers who hold commodities but do not try on can also be determined, and thus can be used as marketing data with high values.

In both the image of FIG. 19B and the image of FIG. 19C, individuals cannot be specified. Therefore, there is an advantage that the images can be operated in a system taking countermeasures for security with low cost compared to the image of FIG. 19A. Since a camera on which the sensor device 1 according to the embodiment is mounted is used, there is no plain data despite installation of malware in an in-store camera. Therefore, there is the advantage that there is no risk of hacking.

3. Modification Examples

The embodiments are not limited to the specific examples described above, but diverse modification examples can be considered.

For example, although particularly mentioned above, an array sensor that includes color filters in, for example, a Bayer array or the like can be used as the array sensor 2. Even when a color image is obtained a captured image, the present technology can be appropriately applied.

When the array sensor 2 that includes color filters is used, for example, a predetermined plurality of pixels formed by vertical×horizontal=plurality of pixels×plurality of pixels are set as one color unit, pixel values are combined for each color unit, and color signal values such as RGB values are obtained. For example, when a Bayer array is adopted, vertical×horizontal=2×2=4 pixels in which RGGB color filters are formed is set as one color unit, pixel values (luminance values) of RGGB are combined of each color unit, and thus a set of RGB values can be obtained.

When the array sensor 2 that includes color filters is used, an encryption key to which random number values are assigned in units of color units can also be generated as an encryption key for image encryption.

Figure 20:
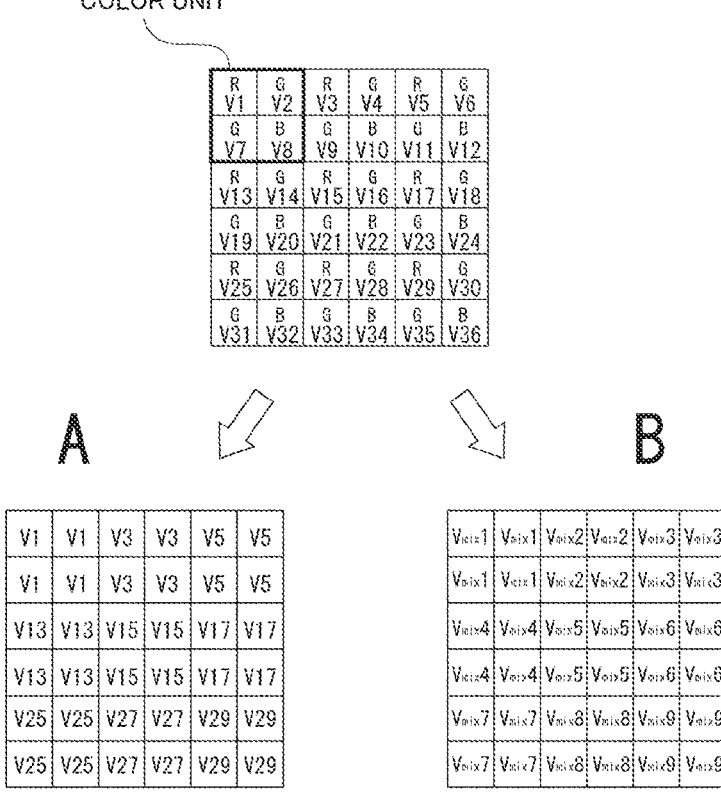
FIG. 20 is a diagram illustrating a generation example of an encryption key to which a random number is assigned in a color unit.

FIG. 20 is a diagram illustrating a generation example of an encryption key to which a random number is assigned in a color unit.

In an example of FIG. 20A, a luminance value of one pixel in a color unit is assigned as a random number value of each pixel in the unit. Specifically, in the example of the drawing, for each color unit, a luminance value of the top left pixel is assigned as a random number value of each pixel in the unit.

In an example of FIG. 20B, for each color unit, a value calculated through predetermined calculation using luminance values of pixels in the unit is assigned as a random number value of each pixel. As a specific example, for each color unit, it is considered that an average value of the luminance values of the pixels in the unit is assigned as a random number value of each pixel in the unit. That is, for a color unit located at the most top left position in the drawing, Vmix1=(V1+V2+V7+V8)/4 is set.

At this time, it is not essential to perform calculation using luminance values of all the pixels in the unit, but calculation may be performed using only luminance values of some pixels. For example, Vmix1=(V1+V7)/2 is set. It is not essential to use an average value for each unit. For example, it is considered that a sum value of luminance values of pixels, such as Vmix1=V1+V2+V7+V8, is assigned for each unit.

By generating the encryption key to which the random number values are assigned in units of color units, as described above, it is possible to further reduce a processing burden than in a case where the random number value is assigned for each pixel.

The example in which an encryption target signal is set as an image signal in the encryption in which the photoelectric random number is used has been given above, but the encryption target signal is not limited to the image signal.

The examples in which the photoelectric random number is used for encryption with regard to the scheme of encrypting the signals read from the pixels of the array sensor 2 and the scheme of encrypting the target region as a target have been described above, but the random number used for encryption is not limited to the photoelectric random number with regard to these schemes. For example, a pseudorandom number can also be used. Alternatively, when a true random number is used, a scheme in which a natural phenomenon of which prediction or reproduction is not substantially possible, such as a change in heat or sound, is detected by a corresponding sensor and random numbers are generated based on the values can be exemplified.

4. Conclusion of Embodiments

As described above, as described in the first embodiment, the encryption device (the sensor device 1) according to an embodiment includes an encryption key generation unit (the encryption control unit 85) that generates an encryption key based on a photoelectric random number which is a random number obtained based on photoelectric conversion by an array sensor (the array sensor 2) in which a plurality of pixels including light-receiving elements for visible light or invisible light are arrayed 1-dimensionally or 2-dimensionally; and an encryption unit (the amplitude control circuit 10 or 10A) configured to encrypt a target signal based on the encryption key generated by the encryption key generation unit.

Thus, it is possible to realize encryption in which it is more difficult to decipher the encryption key than in a case where a pseudorandom number is used. Accordingly, it is possible to achieve an improvement in security.

In the encryption device according to the embodiment, the encryption key generation unit acquires a value of an electrical signal of each pixel obtained through the photoelectric conversion as the photoelectric random number and generates an encryption key.

Thus, it is possible to generate an encryption key which is difficult to decipher. Accordingly, it is possible to achieve an improvement in security.

Further, in the encryption device according to the embodiment, the encryption unit encrypts an image signal obtained through imaging in the array sensor based on the encryption key.

Thus, it is possible to encrypt an image signal with the encryption key to which a coefficient for encryption is assigned for each pixel of the array sensor. Accordingly, it is not necessary to perform a complex calculation process to encrypt an image signal, and thus it is possible to speed up the encryption process.

Furthermore, in the encryption device according to the embodiment, the encryption key generation unit generates the encryption key in a format in which at least some of the values of the electrical signals of the pixels are assigned to pixel positions different from pixel positions at which the values of the electrical signals are obtained.

Thus, it is difficult to decipher the encryption key, compared to a case where an encryption key in which values of electrical signals of pixels are assigned to pixel positions at which the values of the electrical signals are obtained, as they are, is used.

Accordingly, it is possible to achieve an improvement in security.

In the encryption device according to the embodiment, the encryption key generation unit generates the encryption key based on the photoelectric random number obtained a frame period different from a frame period of an image signal which is an encryption target of the encryption unit.

Thus, it is possible to increase difficulty in estimating the encryption key from the encrypted image.

Accordingly, it is possible to achieve an improvement in security.

Further, in the encryption device according to the embodiment, the encryption key generation unit re-acquirees the photoelectric random number when uniformity of values of the electrical signals in at least some of the pixels is acknowledged.

Thus, it is possible to prevent encryption from being performed with an encryption key based on random numbers with low randomness. Accordingly, it is possible to achieve an improvement in security.

Furthermore, in the encryption device according to the embodiment, the encryption key generation unit, the encryption unit, and the array sensor are configured in one package.

Thus, it is possible to achieve tamper resistance in terms of hardware. Accordingly, it is possible to achieve an improvement in security.

In the encryption device according to the embodiment, the encryption key generation unit re-acquires the photoelectric random number in response to detection of an unauthorized access from outside of the encryption device.

Thus, after unauthorized access from the outside is detected, the encryption based on the re-acquired photoelectric random number can be performed. Accordingly, it is possible to achieve an improvement in security.

Further, in the encryption device according to the embodiment, the encryption key generation unit erases the previous generated encryption key from a memory in response to the re-acquisition of the photoelectric random number.

Thus, it is possible to prevent leaking of the encryption key used in the past encryption.

Accordingly, it is possible to prevent the previously encrypted signal from being decoded illegally, and thus it is possible to achieve an improvement in security.

Furthermore, in the encryption device according to the embodiment, the encryption key generation unit erases an image signal which is an origin of the photoelectric random number from a memory in response to generation of the encryption key.

Thus, it is possible to prevent the photelectric random number from being estimated due to leaking of the image which is an origin of the photoelectric random number.

Accordingly, it is possible to achieve an improvement in security.

In the encryption device according to the embodiment, the encryption unit encrypts a target signal in accordance with a stream encryption scheme.

Therefore, it is not necessary to perform preprocessing of the encryption on the target signal.

Accordingly, it is possible to speed up the encryption process.

An encryption method according to an embodiment is an encryption method of generating an encryption key based on a photoelectric random number which is a random number obtained based on photoelectric conversion by an array sensor in which a plurality of pixels including light-receiving elements for visible light or invisible light are arrayed 1-dimensionally or 2-dimensionally; and encrypting a target signal based on the generated encryption key.

According to the encryption method, it is possible to obtain the same operational and advantageous effects as those of the encryption device according to the foregoing embodiment.

According to an embodiment, a sensor device (the sensor device 1) includes: an array sensor (the array sensor 2) in which a plurality of pixels including light-receiving elements for visible light or invisible light are arrayed 1-dimensionally or 2-dimensionally; and an encryption unit (the amplitude control circuit 10 or 10A and the encryption control unit 85) configured to encrypt a read signal from the pixels of the array sensor.

By encrypting the read signal in this way, it is possible to cause an image signal not to be stored in plain text in a memory.

Accordingly, it is possible to achieve an improvement in security.

In the sensor device according to the embodiment, the encryption unit includes a first amplitude control unit (the amplitude control circuit 10) that performs amplitude control of the read signal using an analog signal and the first amplitude control unit performs the amplitude control in accordance with an encryption key to encrypt the read signal.

It is very difficult to acquire the read signal with an analog signal from the outside of the sensor device.

Accordingly, it is possible to achieve an improvement in security.

In the sensor device according to the aspect of the present technology, the encryption unit includes a second amplitude control unit (the amplitude control circuit 10A) that performs amplitude control of the read signal converted into a digital signal by an A/D converter and the second amplitude control unit performs the amplitude control in accordance with an encryption key to encrypt the read signal.

Thus, the encryption is performed through amplitude control on the digital signal, and it is possible to achieve a further improvement in accuracy of the encryption process than in a case where the amplitude control is performed on an analog signal.

Accordingly, it is possible to improve reproducibility of image content when an encrypted image is decoded.

Furthermore, in the sensor device according to the embodiment, the array sensor and the encryption unit are configured in one package.

Thus, it is possible to achieve tamper resistance in terms of hardware. Accordingly, it is possible to achieve an improvement in security.

In the sensor device according to the embodiment, the encryption unit generates an encryption key based on a photoelectric random number which is a random number obtained based on photoelectric conversion by the array sensor and encrypts the read signal based on the generated encryption key.

Thus, it is possible to realize encryption in which it is more difficult to decipher the encryption key than in a case where a pseudorandom number is used. Accordingly, it is possible to achieve an improvement in security.

Further, in the sensor device according to the embodiment, the encryption unit generates the encryption key based on the photoelectric random number obtained during a frame period different from a frame period of the read signal which is an encryption target.

Thus, it is possible to increase difficulty in estimating the encryption key from the encrypted image.

Accordingly, it is possible to achieve an improvement in security.

Furthermore, in the sensor device according to the embodiment, the encryption unit re-acquires the photoelectric random number in response to detection of an unauthorized access from outside of the sensor device.

Thus, after unauthorized access from the outside is detected, the encryption based on the re-acquired photoelectric random number can be performed. Accordingly, it is possible to achieve an improvement in security.

In the sensor device according to the embodiment, the encryption unit erases the previous generated encryption key from a memory in response to the re-acquisition of the photoelectric random number.

Thus, it is possible to prevent leaking of the photoelectric random number using the past encryption.

Accordingly, it is possible to prevent the previously encrypted signal from being decoded illegally, and thus it is possible to achieve an improvement in security.

Further, in the sensor device according to the embodiment, the encryption unit erases an image signal which is an origin of the photoelectric random number from a memory in response to generation of the encryption key.

Thus, it is possible to prevent the photelectric random number from being estimated due to leaking of the image which is an origin of the photoelectric random number.

Accordingly, it is possible to achieve an improvement in security.

Another encryption method according to an embodiment is an encryption method of encrypting a read signal from pixels of an array sensor, the plurality of pixels including light-receiving elements for visible light or invisible light and being arrayed 1-dimensionally or 2-dimensionally.

According to the encryption method, it is possible to obtain the same operational and advantageous effects as those of the sensor device according to the foregoing embodiment.

As described in the second embodiment, another encryption device (the sensor device 1) according to an embodiment includes an array sensor (the array sensor 2) in which a plurality of pixels including light-receiving elements for visible light or invisible light are arrayed 1-dimensionally or 2-dimensionally; a detection unit (the calculation unit 8: in particular, the object region recognition unit 82 and the class identification unit 83) that detects a region of a target shown in an image based on an image signal obtained through imaging in the array sensor; and an encryption unit (the amplitude control circuit 10 or 10A and the encryption control unit 85) that encrypts a target region in the image signal as a target based on information regarding the target region detected by the detection unit.

Thus, it is possible to perform encryption in which at least a person is not specified on an image signal obtained through imaging in the array sensor in the image sensor.

Accordingly, it is unnecessary for an image receiver side to take countermeasures against leakage of personal information, and thus it is possible to reduce cost.

In accordance with a situation in which the decoding key is retained on the image receiver side, it is possible to recognize partial content of an image while concealing personal information. That is, it is possible to realize image encryption in which information is prevented from being excessively concealed.

For example, it is possible to prevent information from being excessively concealed so that it is difficult to ascertain even an imaging location, for example, a store in which an image is captured, and thus it is possible to achieve compatibility between concealment of personal information and prevention of excessive damage of image usability.

In the sensor device according to the embodiment, the encryption unit encrypts the entire image based on a first encryption key as encryption of an image signal and encrypts a target region based on the first encryption key and a second encryption key different from the first encryption key.

Thus, a portion which can be decoded in an image is distinguished separately in accordance with a decoding key retained by the image receiver side. Specifically, when only a decoding key corresponding to the first encryption key is retained, only a region other than the target region in the image can be decoded. When decoding keys corresponding to the first and second encryption keys are retained, the entire image including the target region can be decoded.

Accordingly, it is possible to realize a useful encryption method in which a concealing level of information can be changed step by step separately in accordance with the decoding keys retained on the image receiver side.

Further, in the sensor device according to the embodiment, the detection unit performs a process of recognizing a specific portion of a target and the encryption unit encrypts a region of the specific region and the other region in the target region based on different encryption keys.

Thus, it is possible to change the concealing level of the target separately in accordance with the decoding code retained by the image receiver side. For example, when a target is a person, it is possible to separate concealing levels of concealment of the whole body and concealment of only a face.

Accordingly, it is possible to supply an image encrypted in accordance with a concealing level appropriate for an image usage aspect.

Furthermore, the sensor device according to the embodiment includes an analysis unit (the calculation unit 8) that analyzes an attribute or an action of the target and an output unit (the interface unit 7) that outputs information indicating a result of the analysis by the analysis unit.

Thus, even when the image receiver side does not retain a decoding key, it is possible to provide an analysis result of the attribute or the action of the target.

In the sensor device according to the embodiment, the detection unit decodes an image signal encrypted based on the first encryption key in accordance with an on-the-fly scheme and detects the target.

Thus, it is possible to reduce a possibility of an image signal in a plain text state leaking.

Accordingly, it is possible to achieve an improvement in security.

Further, in the sensor device according to the embodiment, the encryption unit encrypts the image signal based on a combined key obtained by combining a plurality of encryption keys.

Thus, it is possible to realize the encryption in which the concealing level of personal information is changed step by step and it is possible to reduce the number of times a necessary encryption process is performed.

Accordingly, it is possible to reduce a processing burden related to the encryption.

Furthermore, in the sensor device according to the embodiment, the encryption unit encrypts the target region as a target while tracking the target.

Thus, when an encryption target image is a moving image, it is possible to appropriately conceal a moving target.

In the sensor device according to the embodiment, the encryption unit encrypts an image signal in accordance with a stream encryption scheme.

Thus, preprocessing of the encryption of the image signal is not necessary. Accordingly, it is possible to speed up the encryption process.

Further, in the sensor device according to the embodiment, the array sensor and the encryption unit are configured in one package.

Thus, it is possible to achieve tamper resistance in terms of hardware. Accordingly, it is possible to achieve an improvement in security.

Furthermore, in the sensor device according to the embodiment, the encryption unit generates an encryption key based on a photoelectric random number which is a random number obtained based on photoelectric conversion by the array sensor and encrypts the image signal based on the generated encryption key.

Thus, it is possible to realize encryption in which it is more difficult to decipher the encryption key than in a case where a pseudorandom number is used. Accordingly, it is possible to achieve an improvement in security.

In the sensor device according to the embodiment, the encryption unit encrypts a signal read from the pixel of the array sensor.

Thus, it is possible to cause an image signal not to be stored in plain text in a memory for each encryption.

Accordingly, it is possible to achieve an improvement in security.

According to an embodiment, a still another encryption method is an encryption method of detecting a region of a target shown in an image as a target region based on an image signal obtained through imaging in an array sensor in which a plurality of pixels including light-receiving elements for visible light or invisible light are arrayed 1-dimensionally or 2-dimensionally; and encrypting the target region in the image signal as a target based on information regarding the detected target region.

According to the encryption method, it is possible to obtain the same operational and advantageous effects as those of the sensor device according to the foregoing embodiment.

The advantageous effects described in the present specification are merely exemplary, but the present technology is not limited thereto and other advantageous effects may be obtained.

5. Present Technology

The present technology can be configured as follows.

(1)

A sensor device including:

an array sensor in which a plurality of pixels including light-receiving elements for visible light or invisible light are arrayed 1-dimensionally or 2-dimensionally; and an encryption unit configured to encrypt a read signal from the pixels of the array sensor.

(2)

The sensor device according to (1), wherein the encryption unit includes a first amplitude control unit that performs amplitude control of the read signal using an analog signal and the first amplitude control unit performs the amplitude control in accordance with an encryption key to encrypt the read signal.

(3)

The sensor device according to (1), wherein the encryption unit includes a second amplitude control unit that performs amplitude control of the read signal converted into a digital signal by an A/D converter and the second amplitude control unit performs the amplitude control in accordance with an encryption key to encrypt the read signal.

(4)

The sensor device according to any one of (1) to (3), wherein the array sensor and the encryption unit are configured in one package.

(5)

The sensor device according to any one of (1) to (4), wherein the encryption unit generates an encryption key based on a photoelectric random number which is a random number obtained based on photoelectric conversion by the array sensor and encrypts the read signal based on the generated encryption key.

(6)

The sensor device according to (5), wherein the encryption unit generates the encryption key based on the photoelectric random number obtained during a frame period different from a frame period of the read signal which is an encryption target.

(7)

The sensor device according to (5) or (6), wherein the encryption unit re-acquires the photoelectric random number in response to detection of an unauthorized access from outside of the sensor device.

(8)

The sensor device according to (7), wherein the encryption unit erases the previous generated encryption key from a memory in response to the re-acquisition of the photoelectric random number.

(9)

The sensor device according to any one of (5) to (8), wherein the encryption unit erases an image signal which is an origin of the photoelectric random number from a memory in response to generation of the encryption key.

REFERENCE SIGNS LIST

1 Sensor device
2 Array sensor
3 ADC/pixel selector
4 Buffer
5 Logical unit
6 Memory
7 Interface unit
8 Arithmetic unit
10, 10A Amplitude control circuit
20 Bounding box
21 ROI
82 Object region recognition unit
83 Class identification unit
85 Encryption control unit
86 Unauthorized access detection unit
100 Camera device

The invention claimed is:

1. A sensor device comprising:

an array sensor in which a plurality of pixels including light-receiving elements for visible light or invisible light are arrayed 1-dimensionally or 2-dimensionally;

an amplitude control circuitry; and an encryption control circuitry configured to control the amplitude control circuitry to generate an encrypted read signal by performing amplitude control on an analog read signal from the pixels of the array sensor.

2. The sensor device according to claim 1, wherein, to control the amplitude control circuitry to generate the encrypted read signal by performing the amplitude control on the analog read signal from the pixels of the array sensor, the encryption control circuitry is further configured to perform the amplitude control of the analog read signal using coefficients in accordance with an encryption key, wherein each of the coefficients corresponds to one of the pixels of the array sensor.

3. The sensor device according to claim 1, further comprising:

an A/D converter, wherein the encryption control circuitry is further configured to control the A/D converter to convert the analog read signal into a digital read signal, and control the amplitude control circuitry to generate a second encrypted read signal by performing the amplitude control on the digital read signal, wherein the amplitude control of the digital read signal uses coefficients in accordance with an encryption key, and wherein each of the coefficients corresponds to one of the pixels of the array sensor.

4. The sensor device according to claim 1, wherein the array sensor and the encryption control circuitry are disposed in one package.

5. The sensor device according to claim 1, wherein the encryption control circuitry is further configured to obtain a photoelectric random number which is a random number based on photoelectric conversion by the array sensor, generate an encryption key based on the photoelectric random number, and wherein the amplitude control of the analog read signal is performed using coefficients in accordance with the encryption key.

6. The sensor device according to claim 5, wherein the encryption control circuitry is further configured to re-acquire the photoelectric random number in response to a detection of unauthorized access from external to the sensor device.

7. The sensor device according to claim 6, wherein the encryption control circuitry is further configured to erase a previously generated encryption key from a memory in response to a re-acquisition of the photoelectric random number.

8. The sensor device according to claim 5, wherein the encryption control circuitry is further configured to erase an image signal which is an origin of the photoelectric random number from a memory in response to generation of the encryption key.

9. An encryption method comprising:

controlling, with an encryption control circuitry, an amplitude control circuitry to receive an analog read signal from a plurality of pixels of an array sensor, the plurality of pixels including light-receiving elements for visible light or invisible light and being arrayed 1-dimensionally or 2-dimensionally; and controlling, with the encryption control circuitry, the amplitude control circuitry to generate an encrypted read signal by performing amplitude control on the analog read signal.

10. The encryption method according to claim 9, wherein controlling the amplitude control circuitry to generate the encrypted read signal by performing the amplitude control on the analog read signal further includes performing the amplitude control of the analog read signal using coefficients in accordance with an encryption key, wherein each of the coefficients corresponds to one of the pixels of the array sensor.

11. The encryption method according to claim 9, further comprising:

controlling an A/D converter to convert the analog read signal into a digital read signal; and controlling the amplitude control circuitry to generate a second encrypted read signal by performing the amplitude control on the digital read signal, wherein the amplitude control of the digital read signal uses coefficients in accordance with an encryption key, and wherein each of the coefficients corresponds to one of the pixels of the array sensor.

12. The encryption method according to claim 9, further comprising:

obtaining a photoelectric random number which is a random number based on photoelectric conversion by the array sensor, generating an encryption key based on the photoelectric random number, wherein the amplitude control of the analog read signal is performed using coefficients in accordance with the encryption key.

13. The encryption method according to claim 12, further comprising:

detecting unauthorized access from external to a sensor device including the array sensor; and re-acquiring the photoelectric random number in response to the detection of unauthorized access from external to the sensor device including the array sensor.

14. The encryption method according to claim 13, further comprising:

erasing a previously generated encryption key from a memory in response to a re-acquisition of the photoelectric random number.

15. The encryption method according to claim 12, further comprising:

erasing an image signal which is an origin of the photoelectric random number from a memory in response to generation of the encryption key.

16. A non-transitory computer-readable medium comprising instructions that, when executed by an electronic processor, cause the electronic processor to perform a set of operations comprising:

receiving an analog read signal from a plurality of pixels of an array sensor, the plurality of pixels including light-receiving elements for visible light or invisible light and being arrayed 1-dimensionally or 2-dimensionally; and generating an encrypted read signal by performing amplitude control on the analog read signal.

17. The non-transitory computer-readable medium according to claim 16, wherein generating the encrypted read signal by performing the amplitude control on the analog read signal further includes performing the amplitude control of the analog read signal using coefficients in accordance with an encryption key, wherein each of the coefficients corresponds to one of the pixels of the array sensor.

18. The non-transitory computer-readable medium according to claim 16, wherein the set of operations further includes controlling an A/D converter to convert the analog read signal into a digital read signal; and generating a second encrypted read signal by performing the amplitude control on the digital read signal, wherein the amplitude control of the digital read signal uses coefficients in accordance with an encryption key, and wherein each of the coefficients corresponds to one of the pixels of the array sensor.

19. The non-transitory computer-readable medium according to claim 16, wherein the set of operations further includes obtaining a photoelectric random number which is a random number based on photoelectric conversion by the array sensor; and generating an encryption key based on the photoelectric random number, wherein the amplitude control of the analog read signal is performed using coefficients in accordance with the encryption key.

20. The non-transitory computer-readable medium according to claim 19, wherein the set of operations further includes detecting unauthorized access from external to a sensor device including the array sensor; and re-acquiring the photoelectric random number in response to the detection of unauthorized access from external to the sensor device including the array sensor.

* * * * *